(12) United States Patent
Pelletier et al.

(10) Patent No.: US 11,985,559 B2
(45) Date of Patent: *May 14, 2024

(54) SYSTEM AND METHODS FOR PHASED RECONFIGURATION IN WIRELESS SYSTEMS

(71) Applicant: INTERDIGITAL PATENT HOLDINGS, INC., Wilmington, DE (US)

(72) Inventors: Ghyslain Pelletier, Montréal (CA); Yugeswar Deenoo, Chalfont, PA (US)

(73) Assignee: INTERDIGITAL PATENT HOLDINGS, INC., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 17/989,868

(22) Filed: Nov. 18, 2022

(65) Prior Publication Data

US 2023/0080714 A1    Mar. 16, 2023

Related U.S. Application Data

(63) Continuation of application No. 16/495,662, filed as application No. PCT/US2018/023760 on Mar. 22, 2018, now Pat. No. 11,546,815.

(Continued)

(51) Int. Cl.
*H04W 36/00* (2009.01)
*H04L 41/0813* (2022.01)
(Continued)

(52) U.S. Cl.
CPC ... *H04W 36/00837* (2018.08); *H04L 41/0813* (2013.01); *H04W 36/0085* (2018.08);
(Continued)

(58) Field of Classification Search
CPC ....... H04W 36/00837; H04W 36/0085; H04W 36/04; H04W 36/305; H04W 72/20;
(Continued)

(56) References Cited

U.S. PATENT DOCUMENTS 9,226,208 B2  12/2015 Alam et al.
9,237,494 B2  1/2016 Sashihara et al.
(Continued)

FOREIGN PATENT DOCUMENTS

CN   104581849 A    4/2015
CN   106060870      10/2016
(Continued)

OTHER PUBLICATIONS

3GPP TS 36.331 V13.1.0 (3GPP; TSG RAN; E-UTRA; RRC; Protocol specification (Release 13), Mar. 2016) (Year: 2016).*
(Continued)

*Primary Examiner* — Chi H Pham
*Assistant Examiner* — Ji-Hae Yea
(74) *Attorney, Agent, or Firm* — Volpe Koenig

(57) ABSTRACT

A system and methods for performing phased reconfiguration in a wireless communications system are disclosed. A wireless transmit/receive unit (WTRU) may perform a phased reconfiguration from a source cell to a target cell. The WTRU may be connected to the source cell and may execute a first set of functions towards the source cell. The WTRU may monitor for a first set of preconfigured trigger conditions and a second set of preconfigured trigger conditions. The WTRU may commence a second set of functions towards the target cell based on detection of at least one of the first set of preconfigured trigger conditions while continuing to execute the first set of functions towards the source cell. The WTRU may cease to perform at least a subset of the first set of functions towards the source cell (Continued)

based on detection of at least one of the second set of preconfigured trigger conditions.

20 Claims, 11 Drawing Sheets

Related U.S. Application Data

(60) Provisional application No. 62/563,445, filed on Sep. 26, 2017, provisional application No. 62/474,962, filed on Mar. 22, 2017.

(51) Int. Cl.
  *H04W 36/04* (2009.01)
  *H04W 36/30* (2009.01)
  *H04W 74/08* (2009.01)
  *H04W 74/0833* (2024.01)

(52) U.S. Cl.
  CPC ......... *H04W 36/04* (2013.01); *H04W 36/305* (2018.08); *H04W 74/0833* (2013.01)

(58) Field of Classification Search
  CPC ......... H04W 74/0833; H04W 36/0069; H04W 36/00692; H04W 36/00695; H04W 36/00698; H04W 36/008375; H04W 36/00838; H04W 36/18; H04W 36/185; H04W 72/25; H04W 72/27; H04W 72/29; H04L 41/0813
  See application file for complete search history.

(56) References Cited

U.S. PATENT DOCUMENTS

| | | | |
|---|---|---|---|
| 9,521,565 | B2 | 12/2016 | Tenny et al. |
| 10,015,705 | B2 | 7/2018 | Xu et al. |
| 10,764,870 | B2 | 9/2020 | Yi et al. |
| 2009/0075666 | A1 | 3/2009 | Makhijani et al. |
| 2009/0129296 | A1 | 5/2009 | Grinshpun et al. |
| 2010/0124203 | A1 | 5/2010 | Tenny et al. |
| 2010/0184438 | A1 | 7/2010 | Wu |
| 2014/0126545 | A1 | 5/2014 | Tamura et al. |
| 2015/0092746 | A1 | 4/2015 | Jang et al. |
| 2016/0174124 | A1 | 6/2016 | Basu Mallick et al. |
| 2016/0262066 | A1* | 9/2016 | Ozturk ............ H04W 74/0833 |
| 2016/0277987 | A1* | 9/2016 | Chen ................ H04L 5/0085 |
| 2017/0078914 | A1* | 3/2017 | Fujishiro ........... H04W 48/18 |
| 2017/0215117 | A1 | 7/2017 | Kwon et al. |
| 2018/0279193 | A1 | 9/2018 | Park et al. |
| 2019/0246323 | A1 | 8/2019 | Kim et al. |
| 2019/0357093 | A1* | 11/2019 | Xu ................... H04W 36/0058 |
| 2019/0387440 | A1 | 12/2019 | Yiu et al. |
| 2020/0107235 | A1 | 4/2020 | Peisa et al. |

FOREIGN PATENT DOCUMENTS

| | | |
|---|---|---|
| EP | 3 174 329 A1 | 5/2017 |
| WO | 2008/120159 | 10/2008 |
| WO | 2013114203 A2 | 8/2013 |
| WO | 2015168895 A1 | 11/2015 |
| WO | 2016/140757 | 9/2016 |

OTHER PUBLICATIONS

Huawei, HiSilicon ("DC based NR scheme for 0ms interruption handover", 3GPP TSG-RAN WG2 #99, R2-1708877, Aug. 21-25, 2017) (Year: 2017).*
U.S. Appl. No. 62/442,887, Specification, filed Jan. 5, 2017 (Year: 2017).*
AT&T, "Intra-frequency DC to enable mobility with close to zero ms interruption," 3GPP TSG-RAN WG2 #99, R2-1708204, Berlin, Germany (Aug. 21-25, 2017).
China Telecom et al., "Rel-15 Further Mobility Enhancement for EUTRAN," 3GPP TSG RAN Meeting #75, RP-170264, Dubrovnik, Croatia (Mar. 6-9, 2017).
Ericsson, "0 ms interruption support during handover procedure in NR," 3GPP TSG-RAN WG2 #99, R2-1708028, Berlin, Germany (Aug. 21-25, 2017).
Huawei et al., "DC based NR scheme for 0ms interruption handover," 3GPP TSG-RAN WG2 #99, R2-1708877 (Aug. 21-25, 2017).
U.S. Appl. No. 62/442,887, Byun et al., Data Forwarding Procedure for NR, (filed Jan. 5, 2017).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.3.0 (Mar. 2016).
Third Generation Partnership Project, "Technical Specification Group Radio Access Network; Evolved Universal Terrestrial Radio Access (E-UTRA) and Evolved Universal Terrestrial Radio Access etwork (E-UTRAN); Overall description; Stage 2 (Release 14)," 3GPP TS 36.300 V14.1.0 (Dec. 2016).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.0.0 (Dec. 2017).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.5.0 (Dec. 2017).
Third Generation Partnership Project, "Technical Specification Group Radio Access Network; Evolved Universal Terrestrial Radio Access (E-UTRA); Physical layer procedures (Release 13)," 3GPP TS 36.213 V13.2.0 (Jun. 2016).
Third Generation Partnership Project, "Technical Specification Group Radio Access Network; Evolved Universal Terrestrial Radio Access (E-UTRA); Physical layer procedures (Release 14)," 3GPP TS 36.213 V14.1.0 (Dec. 2016).
Third Generation Partnership Project, "Technical Specification Group Radio Access Network; Evolved Universal Terrestrial Radio Access (E-UTRA); Physical layer procedures (Release 14)," 3GPP TS 36.213 V14.5.0 (Dec. 2017).
Third Generation Partnership Project, "Technical Specification Group Radio Access Network; Evolved Universal Terrestrial Radio Access (E-UTRA); Physical layer procedures (Release 15)," 3GPP TS 36.213 V15.0.0 (Dec. 2017).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.1.0 (Mar. 2016).
Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.1.0 (Dec. 2016).
Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.5.0 (Dec. 2017).
Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.0.0 (Dec. 2017).
Third Generation Partnership Project, "Technical Specification Group Radio Access Network; Evolved Universal Terrestrial Radio Access (E-UTRA); Radio Resource Control (RRC);Protocol specification (Release 13)," 3GPP TS 36.331 V13.1.0 (Mar. 2016).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.1.0 (Dec. 2016).

(56) References Cited

OTHER PUBLICATIONS

Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.0.1 (Jan. 2018).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.5.1 (Jan. 2018).
Third Generation Partnership Project, "Technical Specification Group Radio Access Network; Study on new radio access technology: Radio access architecture and interfaces (Release 14)," 3GPP TR 38.801 V14.0.0 (Mar. 2017).
Third Generation Partnership Project, "Technical Specification Group Radio Access Network; Study on New Radio Access Technology; Radio Access Architecture and Interfaces (Release 14)," 3GPP TR 38.801 V2.0.0 (Mar. 2017).
ZTE, "Discussion on single connected handover," 3GPP TSG-RAN WG2 Meeting #99, R2-1708120, Berlin, Germany (Aug. 21-25, 2017).
Ericsson, "Conditional Handover," 3GPP TSG-RAN WG2 #97bis, Tdoc R2-1702675, Spokane, USA (Apr. 3-7, 2017).
Ericsson, "Conditional Handover," 3GPP TSG-RAN WG2 #97Tdoc R2-1700864, Athens, Greece (Jan. 13-17, 2017).
European Telecommunications Standards Institute, LTE; Evolved Universal Terrestrial Radio Access (E-UTRA); Radio Resource Control (RRC); Protocol specification (3GPP TS 36.331 version 11.12.0 (Release 11), ETSI TS 136 331 V11.12.0 (Jul. 2015).
Huawei, "RACH preamble design for NR," 3GPP WG1 NR ad hoc, R1-170034 (Jan. 16-20, 2017).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
Intel Corporation, "NW controlled autonomous handover in single connectivity," 3GPP TSG RAN WG2 Meeting #97, R2-1701711, Athens, Greece (Feb. 13-17, 2017).
Interdigital Communications, "Conditional Reconfiguration for NR" 3GPP TSG-RAN WG2 Ad Hoc, R2-1706690, Qingdao, China (Jun. 27-29, 2017).
Lenovo et al., "Conditional handover in NR," 3GPP TSG-RAN WG2 Meeting#97bis, R2-1702794, Spokane, USA (Apr. 3-7, 2017).
Ortigoza, "Handover Parameters (Part 1 of 3)," Expert Opinion (Feb. 22, 2012).
Samsung, "Introduction of UE autonomous handover," 3GPP TSG-RAN WG2 2017 RAN2#97bis Meeting, R2-1703287, Spokane, USA (Apr. 3-7, 2017).

\* cited by examiner

US 11,985,559 B2

SYSTEM AND METHODS FOR PHASED RECONFIGURATION IN WIRELESS SYSTEMS

CROSS REFERENCE TO RELATED APPLICATIONS

This application is a continuation of U.S. patent application Ser. No. 16/495,662, filed Sep. 19, 2019 which claims the benefit of U.S. National Stage, under 35 U.S.C. § 371, to International Application No. PCT/US2018/023760 filed Mar. 22, 2018, which claims the benefit of U.S. Provisional Application No. 62/474,962, filed Mar. 22, 2017, and to U.S. Provisional Application No. 62/563,445, filed Sep. 26, 2017, the contents of which are hereby incorporated by reference herein.

BACKGROUND

Mobile communications have progressed through several generations of technical specifications. New use cases generally contribute to setting the requirements for each new generation, such as 5G. New use cases for 5G systems may be any case where technical requirements differ from what is already available. A non-limiting list of examples are: improved broadband performance (IBB); industrial control and communications (ICC); vehicular applications (V2X); and massive Machine-Type Communications (mMTC). For 5G systems, New Radio (NR) radio interface and access technologies need to be defined to address the new technical demands of new use cases.

SUMMARY

Systems and methods for performing phased reconfiguration in a wireless communications system are disclosed. A wireless transmit/receive unit (WTRU) may perform a phased reconfiguration from a source cell to a target cell. The WTRU may be initially connected to the source cell and may execute a first set of functions towards the source cell. The WTRU may monitor for a first set of preconfigured trigger conditions (phase-in triggers) and a second set of preconfigured trigger conditions (phase-out triggers). The WTRU may commence a second set of functions towards the target cell based on detection of at least one of the first set of preconfigured trigger conditions while continuing to execute the first set of functions towards the source cell. The WTRU may cease to perform at least a subset of the first set of functions towards the source cell based on detection of at least one of the second set of preconfigured trigger conditions. The sets of functions toward the source and target cells may include: transmitting uplink (UL) data; monitoring for UL grants; monitoring scheduling requests (SRs); monitoring for buffer status reports (BSRs); transmitting channel quality indicator (CQI) information; monitoring for downlink (DL) grant; monitoring for DL or data; transmitting UL acknowledgment/negative acknowledgment (ACK/NACK); transmitting signaling radio bearers (SRBs); entering discontinuous reception (DRX) mode; performing radio link monitoring (RLM); updating system information (sysinfo); or monitoring for paging. The phase-in triggers may include: uplink (UL) resources in the target cell becomes available; UL data is available for transmission in the target cell; or at least one signaling radio bearer (SRB) is established in the target cell. The phase-out triggers may include: all pending snapshot data for the source cell is transmitted; UL resources in the source cell are released; explicit indication to discontinue functions to the source cell is received; packet latency in the source cell is above a threshold; a number of retransmissions in the source cell is above a threshold; a number of downlink (DL) negative acknowledgements (NACKs) in the source cell is above a threshold; an "end of DL" packet marker is received from the source cell; DL monitoring in the source cell is stopped; or signaling radio bearer 1 (SRB1)/signaling radio bearer 2 (SRB2) is released or suspended in the source cell. The WTRU may release UL resources in the source cell when at least one of the following conditions is true: the WTRU is no longer UL time aligned in the source cell; a cell quality of the source cell based on reference signal measurements is below a threshold; or a radio link failure (RLF) occurs in the source cell. The WTRU may suspend first primary SRBs toward the source cell and establish second primary SRBs toward the target cell based on at least one of a third set of preconfigured conditions, which may include completing a random access procedure in the target cell.

BRIEF DESCRIPTION OF THE DRAWINGS

A more detailed understanding may be had from the following description, given by way of example in conjunction with the accompanying drawings wherein.

DETAILED DESCRIPTION

Figure 1A:
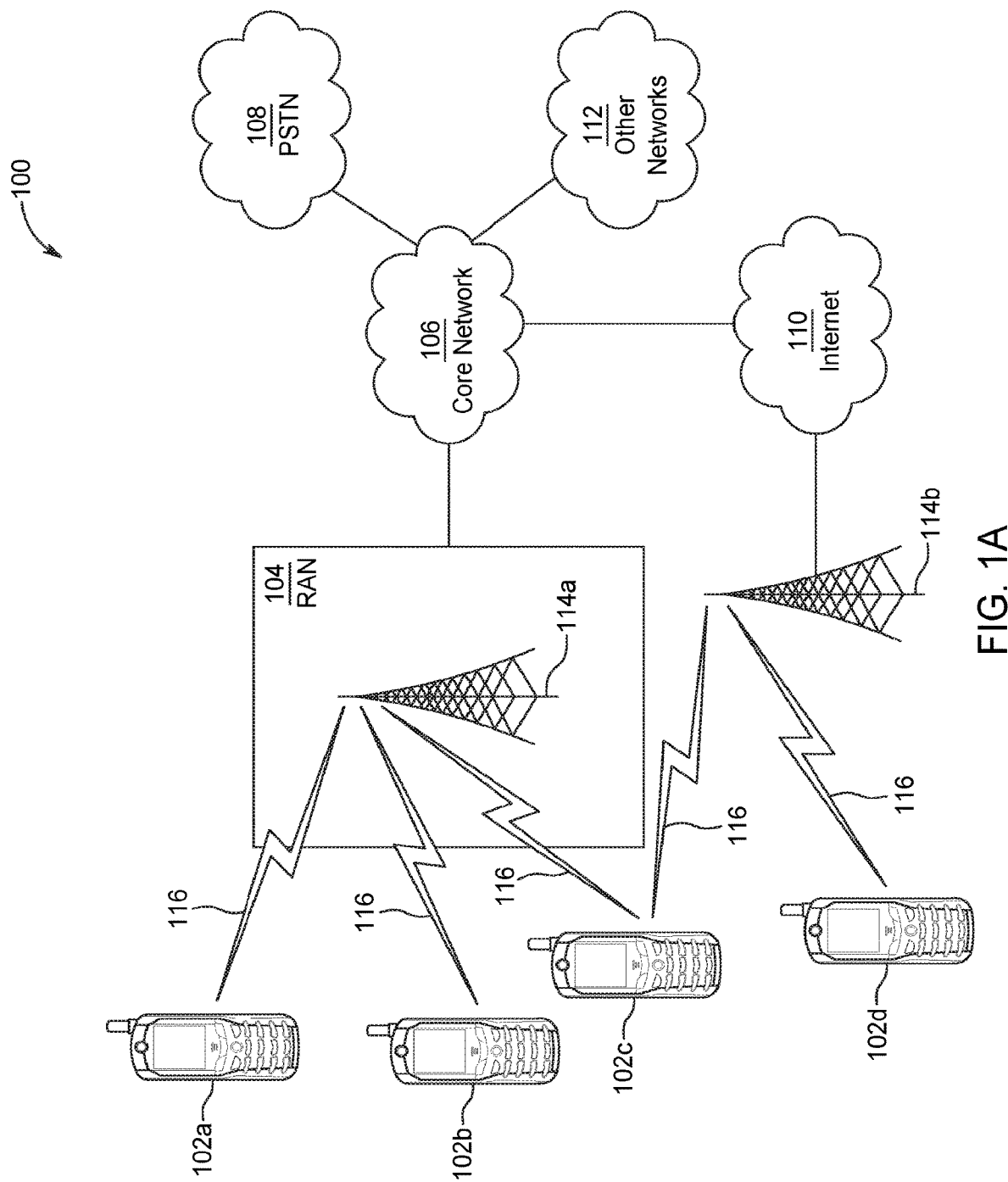
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (Vol P) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
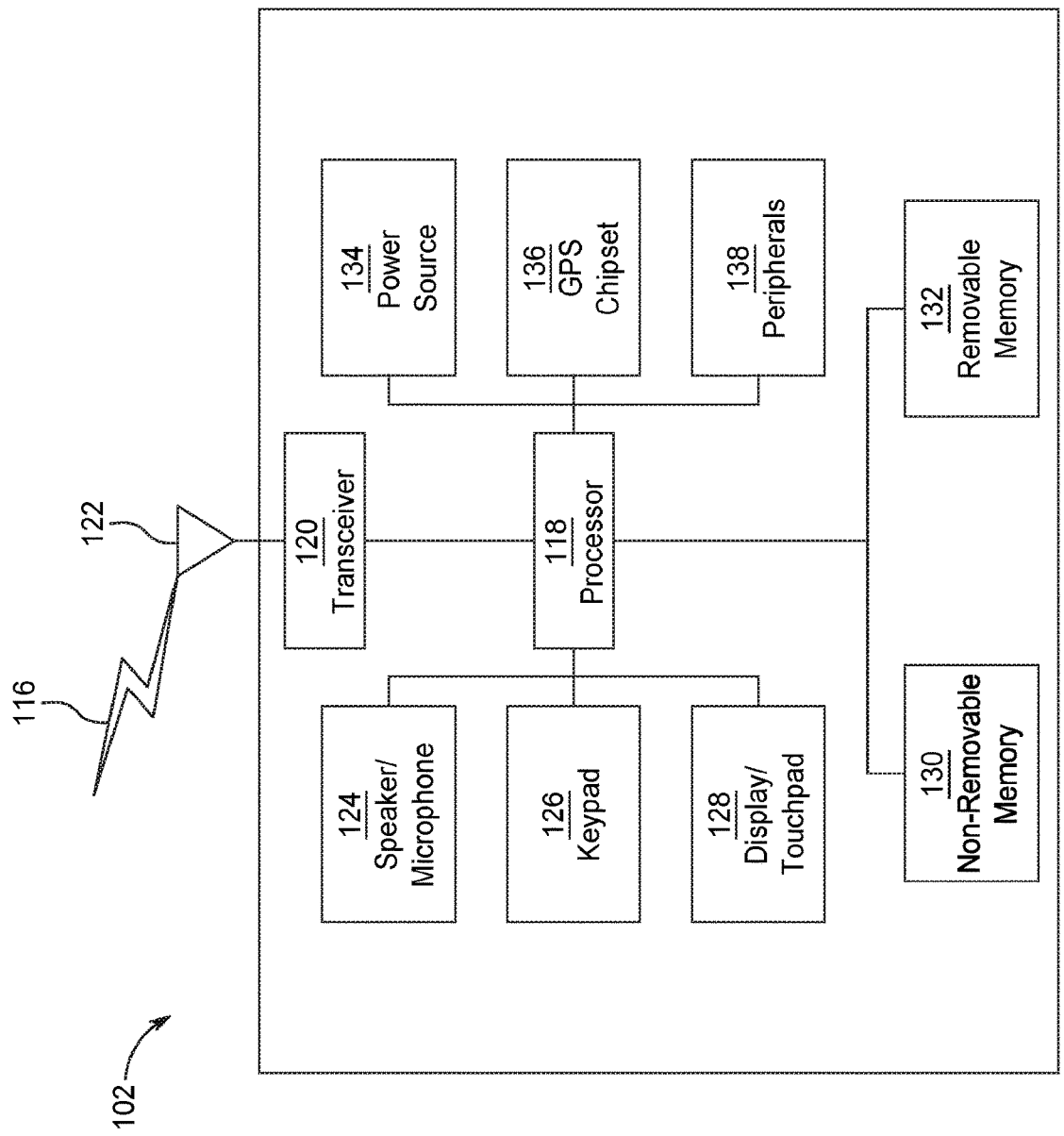
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (10), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (DL) (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
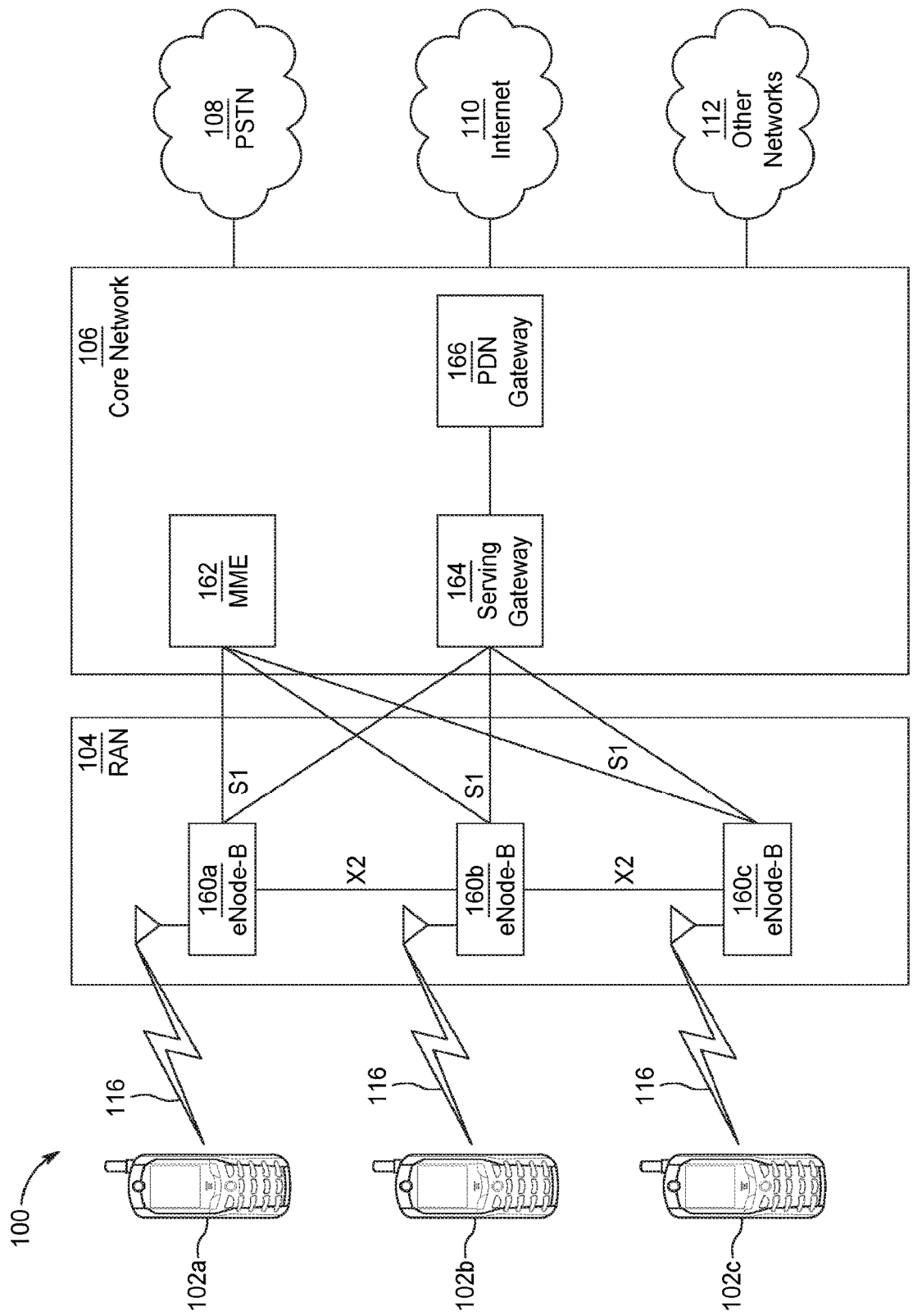
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
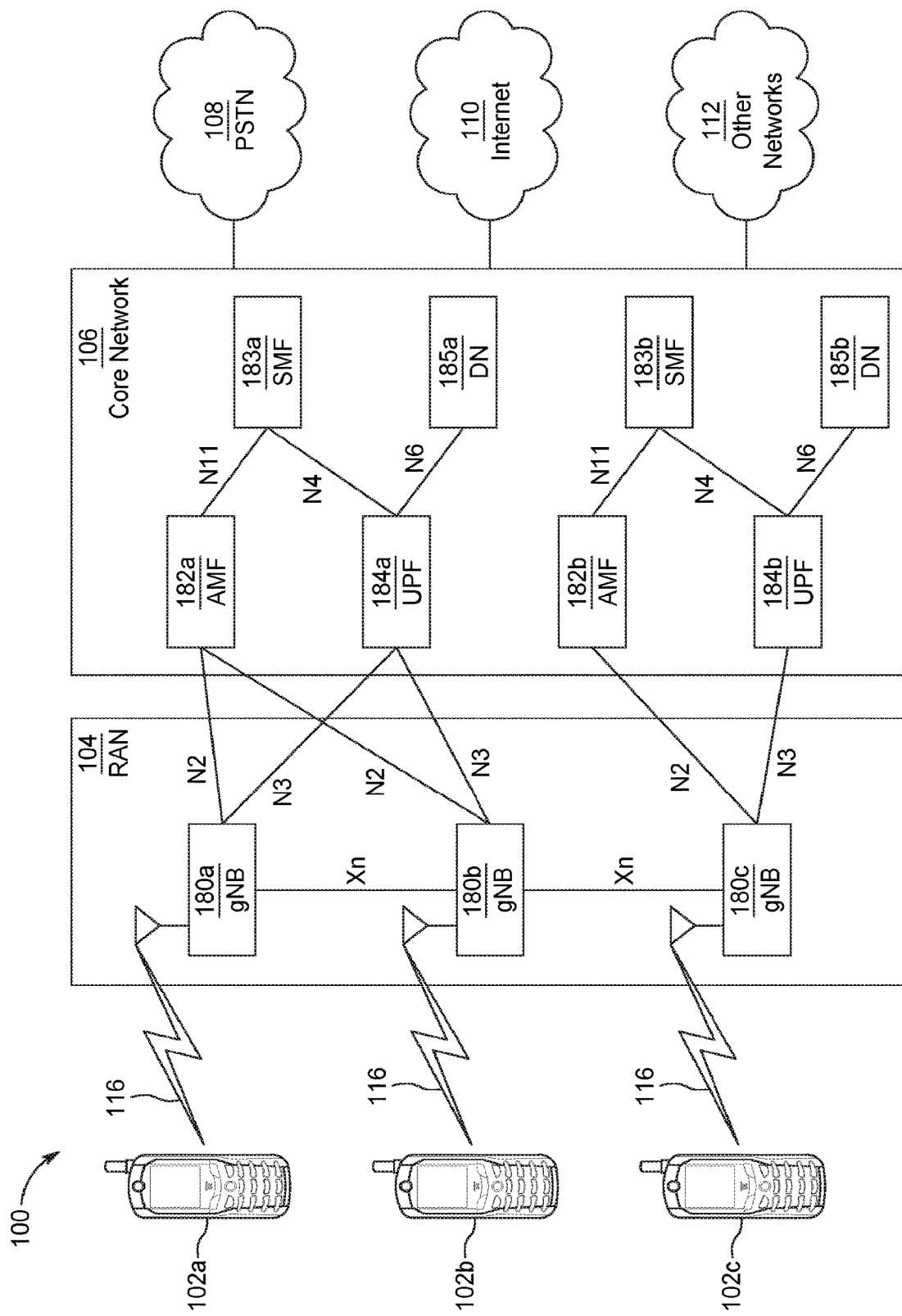
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In a 5$^{th}$ Generation (5G) communication system, a flexible new radio (NR) air interface may be used. The NR air interface for the 5G system may enable use cases such as improved broadband performance (IBB), industrial control and communications (ICC), vehicular applications such as vehicle to everything (V2X) applications, and massive machine-type communications (mMTC). Such use cases may translate to specifications in the 5G interface. For example, in order to support such use cases, the 5G interface may support ultra-low transmission latency including low latency communications (LLC). In another example, the air interface latency may be as low as 1 ms round-trip time (RTT) and may support transmission time intervals (TTIs) with a duration between 100 μs and 250 μs. Support for ultra-low access latency (e.g., time from initial system access until the completion of the transmission of the first user plane data unit) may be of interest in 5G systems (e.g., in ICC and V2X). An example of ultra-low access latency is an end-to-end (e2e) latency of 10 ms. In another example, the 5G interface may support ultra-reliable communications (URC) such as ultra-reliable transmission by providing improved transmission reliability over what is possible with LTE systems, such as close to 99.999% transmission success and service availability. Another consideration may be support for mobility for speed in the range of 0-500 km/h. Some use cases, such as ICC and V2X, may need a packet loss rate (PLR) of less than 10e$^{-6}$.

In another example, the 5G interface may support MTC operation, including narrowband operation. In such an example, the NR air interface may efficiently support narrowband operation (e.g., using less than 200 KHz), extended battery life (e.g. up to 15 years of autonomy), and/or have minimal communication overhead for small and infrequent data transmissions (e.g., low data rate in the range of 1-100 kbps with access latency of seconds to hours).

In another example, the 5G interface may use OFDM as the basic signal format for data transmissions, like in LTE and IEEE 802.11, where OFDM efficiently divides the spectrum into multiple parallel orthogonal sub-bands. In OFDM, each subcarrier may be shaped using a rectangular window in the time domain, leading to sine-shaped subcarriers in the frequency domain. OFDMA thus may need perfect frequency synchronization and tight management of UL timing alignment within the duration of the cyclic prefix to maintain orthogonality between signals and to minimize inter-carrier interference. Such tight synchronization may not be well-suited in a system where a WTRU is connected to multiple access points simultaneously. Additional power reduction may be applied to UL transmissions to comply with spectral emission requirements to adjacent bands, in particular in the presence of the aggregation of fragmented spectrum for a WTRU's transmissions.

Some of the shortcomings of conventional OFDM that relies on cyclic prefix (CP) (CP-OFDM) may be addressed by more stringent radio frontend (RF) requirements, especially when using large amounts of contiguous spectrum that may not need aggregation. A CP-based OFDM transmission scheme may also lead to a downlink (DL) physical layer for 5G similar to that of legacy systems, for example with modifications to pilot signal density and location. Therefore, a proposed 5 gFLEX design may consider waveform candidates besides OFDM, although conventional OFDM remains a possible candidate for 5G systems at least for the DL transmission scheme. The 5 gFLEX radio access design may be characterized by a very high degree of spectrum flexibility that enables deployment in different frequency bands with different characteristics, including different duplex arrangements, and different and/or variable sizes of the available spectrum including contiguous and non-contiguous spectrum allocations in the same or different bands. It may also support variable timing aspects including support for multiple TTI lengths and support for asynchronous transmissions.

In another example, the 5G interface may support time division duplex (TDD) and frequency division duplex (FDD) duplexing schemes. For FDD operation, supplemental DL operation may be supported using spectrum aggregation. FDD operation may support both full-duplex FDD and half-duplex FDD operation. For TDD operation, the DL/UL allocation may be dynamic: it may not be based on a fixed DL/UL frame configuration but rather the length of a DL or a UL transmission interval may be set per transmission opportunity.

In a 5G communication system, beamforming may also be used. For example, beamforming may be used to compensate increased pathloss at higher frequencies (e.g. frequencies greater than 6 GHz). A large number of antenna elements may be used to achieve higher beamforming gain. Analog and/or hybrid beamforming may be used to reduce implementation cost (i.e., reduce the number of RF chains). Analog/hybrid beams may be multiplexed in time. For example, beamforming may be applied to the synchronization channel, the physical broadcast channel (PBCH), and/or any control channels to provide cell wide coverage. The term "beam sweep" may be used herein to refer to transmission/reception of beamformed channels multiplexed in time and/or frequency and/or space.

The term "reference signal" may be used herein to refer to any signal, preamble and/or system signature that may be received and/or transmitted by the WTRU for one or more of the purpose(s) described herein. In an example, different reference signals may be defined for beam management in the DL and/or UL. For example, the DL beam management may use, but is not limited to use, any of the following reference signals: channel state information (CSI) reference signal (CSI-RS), demodulation reference signal (DMRS), and/or synchronization signal. In another example, the UL beam management may use, but is not limited to use, any of the following reference signals: sounding reference signal (SRS), DMRS, and/or random access channel (RACH).

Next generation air interfaces, such as further evolution of LTE Advanced Pro and New Radio (NR), may support a wide range of use cases with varying service requirements, such as low overhead low data rate power efficient services (e.g., mMTC), ultra-reliable low latency services (URLLC), and high data rate mobile broadband services (eMBB). This wide range of uses may be implemented with a diverse selection of WTRU capabilities, such as low power low bandwidth WTRUs, WTRUs capable of very wide bandwidth (e.g., 80 MHz), and/or WTRUs capable of supporting high frequencies (e.g., greater than 6 GHz). Moreover, the various WTRU capabilities may be supported under a variety of mobility scenarios (e.g., in the range from stationary/ fixed to high speed trains). Based on these possibilities, a 5G system may use an architecture that is flexible enough to adapt to diverse deployment scenarios. Examples of deployment scenarios that may be supported by a flexible 5G system architecture may include, but are not limited to include, the following deployment scenarios: standalone, non-standalone with assistance from a different air interface, centralized, virtualized, distributed over ideal backhaul, and/or distributed over non-ideal backhaul.

In order to support latency-critical services, a goal for next generation air interfaces, such as the NR air interface, may be to minimize interruption time during mobility events (i.e., mobility interruption time). The interruption time may be defined as the time duration during which a WTRU cannot exchange user plane packets with any base station. A mobility interruption time, even on the order of tens of milliseconds, may not be acceptable or feasible for latency-critical URLLC services (e.g., tactile Internet, industrial automation, remote surgery, augmented reality). Such latency-critical services have led to the possibility of target latency requirements that may be close to 0ms in interruption time for NR systems. Service interruption may also have an impact on the TCP performance, especially for high-throughput (HT) services. For example, larger interruption times may be seen as congestion by TCP, which subsequently reduces the data rate to cope up with congestion. Thus, systems and methods disclosed herein may reduce mobility interruption and address other aspects related to the mobility interruption problem.

In the case of latency-critical services, another goal of next generation air interfaces may be to handle user plane data forwarding in the network during mobility (or other) events for latency critical services in order not to exceed maximum latency requirements for the latency-critical services. For example, latency critical services may be expected to have over-the-air latency requirements not exceeding 1 ms. However, for a non-ideal interface based on fiber access, forwarding latency may be in the 2 ms-5 ms range, or more, which would then be added to the packet delay budget when forwarding is performed. Systems and methods disclosed herein may avoid the need for data forwarding for latency-critical services and thus meet latency requirements.

In scenarios involving dense deployments of network elements where the number of mobility events may be more frequent, the interruption times may be increased, additional latency may occur due to forwarding over the backhaul, and the quality of service (QoS) may be negatively impacted. Thus, systems and methods disclosed herein may minimize and/or avoid the interruptions due to mobility events to mitigate some of these issues.

According to the disclosures herein, systems and methods provide phased reconfiguration of a WTRU that is moving between a source cell and a target cell. While a WTRU executes a first set of functions towards a source cell, the WTRU may be configured to perform phased reconfiguration, whereby the WTRU may trigger a second set of functions towards the target cell while performing a third set of functions towards the serving cell, and the WTRU based on preconfigured triggers may stop performing one or more of the third set of functions towards the serving cell.

According to the disclosures herein, a WTRU, while executing the first set of functions towards a source cell, may be configured to perform phased reconfiguration, wherein the WTRU may trigger a second set of functions towards a target cell based on a first set of preconfigured trigger conditions (e.g., 'phase-in' triggers) and the WTRU may stop performing one or more functions out of the first set of functions towards the serving cell based on a second set of preconfigured trigger conditions (e.g., 'phase-out' triggers).

Different types of backhaul solutions may be used in a next generation radio access network (e.g., 5G network). Even though an ideal backhaul has highly desirable properties, such as very high throughput and very low latency, it may not be practical from the perspective of performance-cost tradeoff. For this reason, a non-ideal backhaul may be widely deployed. Examples of non-ideal backhaul characteristics are shown in Table 1.

TABLE 1

Examples of Non-Ideal Backhaul Characteristics

| Backhaul Technology | Latency (One way) | Throughput |
|---|---|---|
| Fiber Access 1 | 10-30 ms | 10 Mbps-10 Gbps |
| Fiber Access 2 | 5-10 ms | 100-1000 Mbps |
| Fiber Access 3 | 2-5 ms | 50 Mbps-10 Gbps |
| DSL Access | 15-60 ms | 10-100 Mbps |
| Cable | 25-35 ms | 10-100 Mbps |
| Wireless Backhaul | 5-35 ms | 10-100 Mbps, but may be up to Gbps range |

In an example, a WTRU may maintain a minimal Uu air interface with a source cell until a trigger occurs while the WTRU is establishing a Uu air interface with a target cell. For example, a WTRU may be configured to maintain connectivity with a first source carrier (in the source cell) while the WTRU initiates the establishment of a connection (in the target cell) using a second target carrier. This WTRU phased reconfiguration behavior may occur after the WTRU determines that it should perform a reconfiguration from a source configuration that includes the first carrier in the source cell to a target configuration that includes the second carrier in the target cell. The WTRU may determine the need for a reconfiguration autonomously, for example by using a previously received connection configuration instruction, or upon reception of control signaling from the network (e.g., from the gNB) that triggers the initiation of a reconfiguration with mobility control information. The WTRU phased reconfiguration behavior may occur when the reconfiguration does not include a configuration for the first carrier, such as at a mobility event from a source cell to a target cell. In an example case, the simultaneous use of resources associated with different carriers may be performed in a time-division manner or in a frequency-division manner.

As part of the WTRU phased reconfiguration behavior, the WTRU may phase out its operations for the source cell. The WTRU may continue transmissions using the resources of the first (source) carrier (i.e., the source cell), while it initiates transmissions using the resources of the second (target) carrier (i.e., the target cell). The WTRU may operate using resources of the first carrier using a phased approach whereby some functions previously applicable to the source carrier may be stopped, while other functions may be modified or continued until the WTRU determines from a trigger (there may be many possible triggers) that it should entirely remove the first carrier from its configuration.

As part of the WTRU phased reconfiguration behavior, the WTRU may phase in its operations for the target cell. The WTRU may initiate transmissions using the resources of the second (target) carrier (i.e., the target cell), while the WTRU continues being active in transmissions using the resources of the first (source) carrier (i.e., the source cell). The WTRU may operate using resources of the second carrier using a phased approach whereby some functions may be started initially (e.g., functions that were previously applicable to the source carrier and that may have been stopped for that source carrier), while other functions may be started later. For example, the WTRU may determine to start such other functions for the second carrier from a trigger (there may be many possible triggers) that it should entirely remove the first carrier from its configuration.

In non-phased reconfiguration, the WTRU may apply/perform reconfiguration as soon as the WTRU receives the configuration. In a phased reconfiguration, the WTRU may apply a first set of reconfigurations based on a first set of trigger conditions towards the source cell and may apply a second set of reconfigurations based on a second set of trigger conditions towards a target cell.

Figure 2:
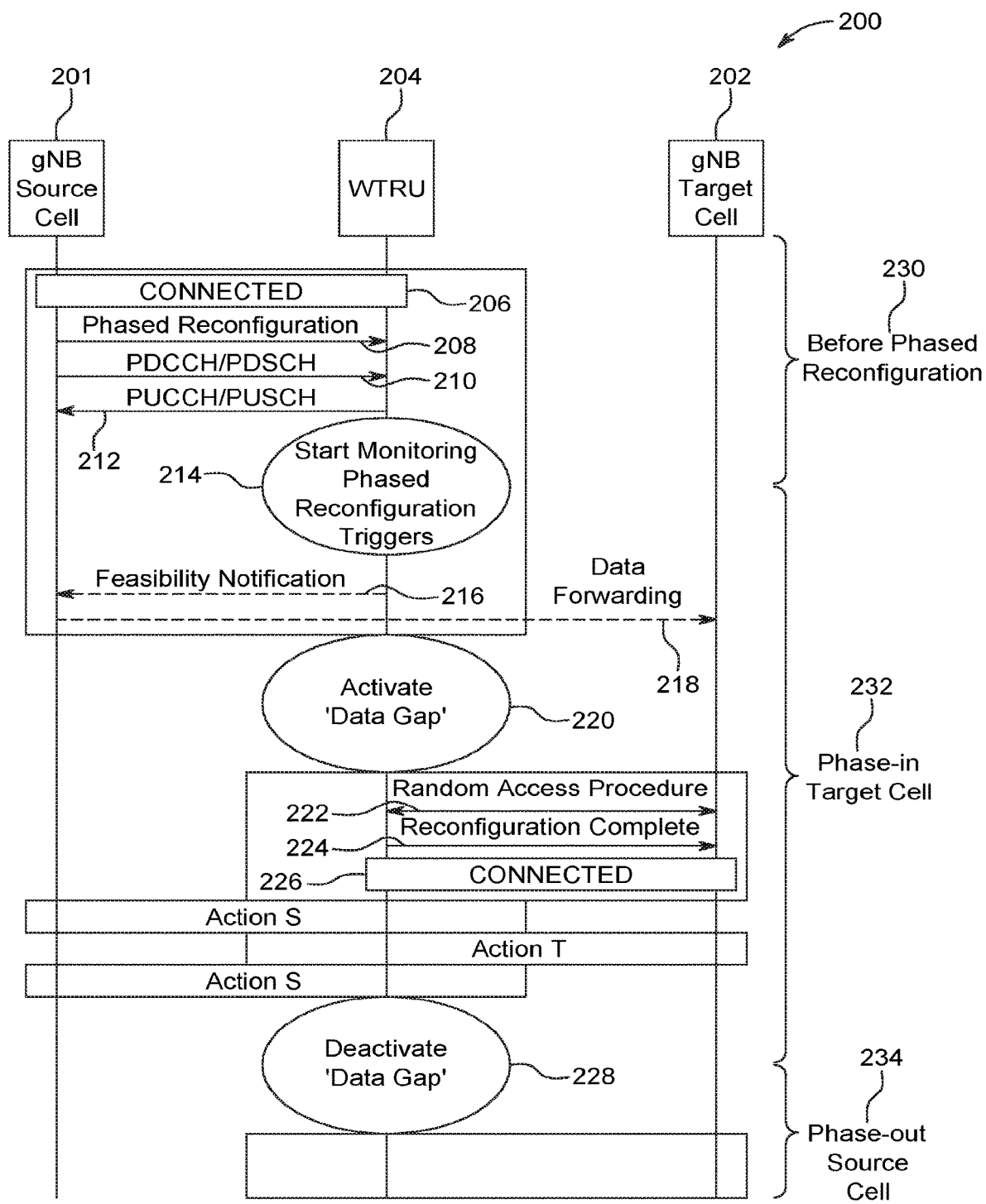
FIG. 2 is a signaling diagram of an example phased reconfiguration procedure for a WTRU from a source cell to a target cell.

FIG. 2 is a signaling diagram of an example phased reconfiguration procedure 200 for a WTRU 204 from a source cell/gNB 201 to a target cell/gNB 202. The example phased reconfiguration procedure 200 may include the following stages, which may or may not occur, partially or fully, in parallel: a before phased reconfiguration stage 230, a phase-in target cell stage 232, and a phase-out source cell stage 234. Prior to phased reconfiguration 230, the WTRU 204 may be in a CONNECTED state 206 with source cell/gNB 201, and may receive a control signal 208 from gNB 201. The control signal (message) 208 may indicate a phased reconfiguration including phase-in and/or phase-out triggers. In an example, not shown, the WTRU 204 may autonomously initiate phased reconfiguration without receiving control signal 208. While in CONNECTED state 206, the WTRU may receive data and/or control information (e.g., physical downlink control channel (PDCCH)/physical downlink shared channel (PDSCH) 210) from gNB 201, and/or may send data and/or control information (e.g., physical uplink control channel (PUCCH)/physical uplink shared channel (PUSCH) 212) to gNB 201.

At 214, the WTRU 204 may start to monitor one or more phase-in and/or phase-out triggers as indicated by the received phased reconfiguration control message 208. The WTRU 204 may send a feasibility notification 216 when the WTRU 204 can simultaneously receive and process transmissions from the source cell 201 and the target cell 202. The purpose of the feasibility notification 216 may be to assist the network in the timing of the start of the phased reconfiguration procedure 200 and in the determination of how to perform data forwarding in the network. The source gNB 201 may perform data forwarding 218 of information, intended for the WTRU 204, to the target gNB 202. When a phased reconfiguration is initiated, the WTRU 204 may be configured to enter non-discontinuous reception (DRX) in the source cell 201. Activation of a data gap, 220, may refer to the WTRU applying a preconfigured time-division multiplexing (TDM) pattern, to time multiplex transmissions to the source cell 201 and/or target cell 202 (like a measurement gap for data transmission). If a data gap is configured, the WTRU 204 may activate the data gap 220 such that the WTRU 204 may perform continuous monitoring during the data gap period on the source cell 201. The WTRU 204 may perform a random access (RACH) procedure 222 with target gNB 202 to become connected 226 with target cell 202. The WTRU 204 may be connected to both gNB 201 and gNB 202 for a period of time. The WTRU 204 may send a reconfiguration complete message 224 to gNB 202 to indicate a role change to target cell 202.

Actions to source cell 201 ("action S") and actions to target cell 202 ("action T") may occur in parallel. Action S may correspond to functions (a first set of functions) the WTRU 204 performs in the source cell 201 (e.g., the column "WTRU behavior when phased reconfiguration condition is triggered' in Table 2 below). Action T may correspond to functions (a second set of functions) performed by the WTRU 204 in target cell 202 (e.g., column "times/events when WTRU may perform function in target cell' in Table 2 below).

In an example, the WTRU 204 may be configured to perform transmissions and/or receptions to/from the source cell 201 and target cell 202 simultaneously based on WTRU capability and/or deployment considerations. For example, the WTRU 204 with independent RF chains may be configured for simultaneous operation. For example, the WTRU 204 may be capable of achieving spatial isolation and/or interference mitigation towards the source cell 201 and target cell 202 using beamforming and/or interference cancellation in order to enable simultaneous operation. In an example, a deployment with a small timing difference between the source cell 201 and target cell 202 may be conducive to simultaneous operation.

The WTRU 204 may be able to perform transmissions/receptions simultaneously with the source cell 201 and the target cell 202. For example, simultaneous transmission/reception may be possible when the source cell 201 and the target cell 202 are using the same frequency/frequencies, and/or using interference mitigation/cancellation, and/or using two simultaneous non-overlapping beams. Such simultaneous transmissions/receptions may be also possible in the inter-frequency case if the WTRU 204 has independent radio frontend (RF) chains. During the phase-out source cell stage 234, the WTRU 204 may deactivate the data gap 228, such that the WTRU 204 may stop transmissions to source cell 201 and/or may no longer time multiplex (TDM) transmissions with source cell 201. Elements of phased reconfiguration, such as the elements shown in the example phased reconfiguration procedure 200, are described in more detail below.

As explained above, the WTRU may initiate the phased reconfiguration. In an example, the WTRU may autonomously initiate a phased reconfiguration, for example based on phase-in triggers and/or phase-out triggers. The WTRU may receive a first reconfiguration that includes configuration information to be applied with the target cell and associated triggers (e.g., phase-in triggers) for when to apply the configuration for the target cell. Examples of phase-in triggers are given in the column "times/events when WTRU may perform function in target cell" in Table 2. The WTRU may receive a second reconfiguration that includes configuration information to be applied in the source cell and associated triggers (e.g., phase-out triggers) for when to apply the configuration for the source cell. Examples of phase-out triggers are shown in the column "times/events when WTRU may no longer perform function in source cell" in Table 2. The first and second reconfigurations may be received in the same message or in separate messages. In another example, the WTRU may receive DL control signaling and determine therefrom that the WTRU should initiate a phased reconfiguration. For example, the WTRU may be configured to execute a first reconfiguration associated with the target cell, and in parallel or subsequently execute a second reconfiguration associated with the source cell.

The WTRU may be configured to transmit a notification, such as a feasibility notification, when the WTRU can simultaneously receive and process transmissions from a source cell and target cell. The purpose of such UL control signaling towards the network is to assist the network in the timing of the start of the phased reconfiguration procedure and in the determination of how to perform data forwarding in the network. In an example, a WTRU may be configured to transmit a feasibility notification when all conditions required for a phased reconfiguration are triggered or satisfied. In another example, a WTRU may be configured to transmit a feasibility notification when one or more criteria required for phased reconfiguration are triggered or satisfied. In another example, a WTRU may be configured to report an individual event necessary for phased reconfiguration to the network, for example to the source cell.

In another example, a WTRU may be configured to transmit a feasibility notification when a reconfiguration with mobility control information (e.g., a handover command) is received and one or more conditions for phased reconfiguration are satisfied. In an example, a WTRU may transmit a feasibility response (e.g., feasibility notification) to the source cell upon receiving a feasibility request, where the feasibility request may query the status of one or more events/criteria as measured by the WTRU. In an example, a WTRU may multiplex the feasibility indication with a measurement report. The measurement report may contain various candidate cells and associated measurement results. The WTRU may indicate whether it can simultaneously transmit/receive from both the serving cell and the candidate cell in the measurement report. The WTRU may indicate the feasibility of phased reconfiguration for each candidate in the measurement report.

A WTRU may transmit a feasibility notification, start accessing the target cell, and/or start monitoring for phase-in triggers, when any one or more of the following conditions are satisfied. According to an example condition, a WTRU buffer status exceeds a predefined threshold (e.g., for one or more preconfigured data radio bearers (DRBs)). In another example condition, a WTRU RX beamforming may achieve sufficient spatial isolation between DL transmissions from the source cell and target cell (e.g., a WTRU may determine that sufficient spatial isolation is achieved if signal-to-interference-plus-noise ratio (SINR) associated with at least one transmission from the source cell and at least one transmission beam from the target cell is above a threshold).

In another example condition, the DL timing difference between a source cell and target cell is within a threshold (e.g., within CP). In another example condition, the quality (e.g., associated with a reference signal measurement) of a source cell is above a predefined threshold; the quality (e.g., associated with a reference signal measurement) of the target cell is above a predefined threshold. In another example condition, UL synchronization is still valid with the source cell (i.e., time alignment timer (TAT) is not expired). In another example condition, a radio link monitoring (RLM) status of a source cell indicates no radio link failure (RLF) has occurred or that a timer associated with radio link recovery (e.g., T310) is not running.

A WTRU may indicate the preferred transmission beam from the source cell and target cell that can achieve the spatial isolation. A WTRU may include a status report of WTRU buffers associated with data transmission towards the source cell (e.g., a snapshot of WTRU buffers when the phased reconfiguration is triggered) in the feasibility notification message.

Examples of WTRU functionality and behaviors during a phased reconfiguration are shown in Table 2. The WTRU behaviors in Table 2 may be a function of various phase-in and phase-out triggers, and may be in terms of a first set of functions applicable for the source carrier (source cell) and a second set of functions applicable to the target carrier (target cell).

TABLE 2

Example WTRU functionality and behaviors during phased reconfiguration

| WTRU function | WTRU behavior when phased reconfiguration condition is triggered | Times/events when WTRU may no longer perform function in source cell ("phase-out triggers") | Times/events when WTRU may perform function in target cell ("phase-in triggers") |
| --- | --- | --- | --- |
| UL data transmission | For DRBs for which phased reconfiguration is configured: WTRU may stop delivery of new packet data convergence protocol (PDCP) packet data units (PDUs) to radio link control (RLC) entities associated with the source cell WTRU may attempt to transmit the snapshot of data in WTRU buffers (e.g., at RLC and/or medium access control (MAC) layers) to the source cell For the rest of the DRBs: WTRU may reestablish RLC entities; WTRU may not reset-MAC associated with the source cell | The earliest of following: When all pending snapshot data is transmitted UL resources in source cell are released Receiving explicit indication from source or target cells Packet latency is above a threshold and/or number of retransmissions/DL negative acknowledgements (NACKs) is above a threshold | For DRBs for which phased reconfiguration is configured and duplication is enabled: Transmit duplicate PDUS, when UL resources in target becomes available. For all configured DRBs/signaling radio bearers (SRBs): Transmit when UL resources in target cell become available |
| Monitoring for UL grant, scheduling request (SR) transmission, and/or buffer status report (BSR) transmission | Continue performing the functions in the source cell | The earliest of: When all pending snapshot data is transmitted UL resources in source cell are released | Start performing the functions when UL data is available for transmission in target cell |

TABLE 2-continued

Example WTRU functionality and behaviors during phased reconfiguration

| WTRU function | WTRU behavior when phased reconfiguration condition is triggered | Times/events when WTRU may no longer perform function in source cell ("phase-out triggers") | Times/events when WTRU may perform function in target cell ("phase-in triggers") |
|---|---|---|---|
| Channel quality indicator (CQI) transmission | Continue performing the functions in the source cell, or WTRU may stop CQI transmission to source cell and source cell may assume a default value for CQI (e.g., CQI = 1). | Receiving explicit indication from source or target cells The earliest of following: receiving "End of DL" packet marker from source cell UL resources in source cell are released Receiving explicit indication from source or target cells | Start performing the function when UL resources in target cell become available using the PUCCH resources with periodicity as configured for target cell |
| Monitoring for DL grant/data + UL ACK/NACK transmission | | The earliest of following: 'End of DL' packet marker from source UL resources in source cell are released Receiving explicit indication from source or target cells | Start monitoring when condition for reconfiguration is satisfied |
| Signaling radio bearer (SRB) transmission | Continue performing the function in the source | UL resources in source cell are released | Start performing the function when UL resources in target cell become available |
| Discontinuous reception (DRX) | Activate data gap pattern for single RX/TX (or) enter non-DRX mode in source cell | When DL monitoring in the source cell is stopped | When SRB is established in the target cell |
| Radio link monitoring (RLM) | Continue performing the function in source cell, and RLF may be declared when target cell fails | When SRB1/2 is released/suspended in the source cell | Start monitoring when SRB1/2 is established in the target cell |
| Sysinfo update/paging monitoring | Stop monitoring when condition for reconfiguration is satisfied | Stop monitoring when SRB1/2 is released/suspended in the source cell | Start monitoring when SRB1/2 is established in the target cell |

Examples of resources associated with the WTRU and WTRU behaviors during a phased reconfiguration are shown in Table 3. Other resources not shown in Table 3 may be affected by phased reconfiguration (e.g., UL ACK/NACK, SCI resources, PRACH, SR, PUSCH). The WTRU behaviors in Table 2 may be a function of various triggers, and may be in terms of a first set of functions applicable for the source carrier (source cell) and a second set of functions applicable to the target carrier (target cell).

TABLE 3

Example resources and WTRU behaviors during phased reconfiguration

| Resource(s) | WTRU behavior when phased reconfiguration condition is triggered | Times/events when WTRU may no longer use resource in source cell | Times/events when WTRU may use resource in target cell |
|---|---|---|---|
| PDCCH (Control channel search space) | WTRU may switch to a restricted control channel search space (in time/frequency) | Phased reconfiguration expires | Phased reconfiguration is triggered |
| PDSCH | UE may start to monitor a pre-allocated resource in the source cell | Phased reconfiguration expires | Phased reconfiguration is triggered |

In the following, examples are given of WTRU behaviors in the source cell after initiation of phased reconfiguration. In an example, for WTRU behavior in a source cell after initiation of phased configuration, the WTRU may be configured to release UL resources in the source cell when one or more of the following conditions are true: the WTRU is no longer UL time aligned (e.g., upon TAT expiry); the serving (source) cell quality (e.g., based on reference signal measurement(s)) is below a threshold; and/or an RLF has occurred in the source cell. In an example, the WTRU may be configured with a conservative RLF threshold when phased reconfiguration is active.

In an example, the WTRU may be configured to release the phased reconfiguration (i.e., stop transmission/reception to/from the source cell) when one or more of the following conditions are true: UL resources in the source cell are released; for UL data transmission, WTRU UL buffer(s) associated with DRBs configured for data transmission in the source cell are empty; for DL, when a WTRU receives the last DL PDU (e.g., when the source cell does not have any more PDUs to transmit to the WTRU, as may be indicated by an 'End of DL' packet marker from the source cell); and/or when a WTRU receives any other explicit indication from the source and/or target cells (e.g., when a WTRU receives a control message indicating that the phased configuration should be released). In an example, the WTRU may be configured to transmit a notification to the target cell upon release of a phased reconfiguration.

In an example, the WTRU may be configured to stop subsequent delivery of new PDCP PDUs to RLC entities associated with the source cell. In an example, the WTRU may perform such action only for preconfigured DRBs, such as DRBs needing low latency and minimal service interruption. For the rest of the DRBs, the WTRU may reestablish the PDCP/RLC entities with the target cell. The WTRU may not reset the MAC entity associated with the source cell. The WTRU may continue performing procedures related to UL grant monitoring, scheduling request (SR) transmission, and/or BSR transmission in the source cell. The WTRU may attempt to transmit the snapshot of data in WTRU transmission buffers (e.g., RLC segments, unacknowledged RLC PDUs) to the source cell.

In an example, the WTRU may be configured to stop UL transmissions in the source cell when one or more of the following criteria are satisfied: for UL data transmission, WTRU UL buffers associated with DRBs configured for data transmission in the source cell are empty; UL resources in the source cell are released; packet latency is above a threshold and/or a number of retransmissions/DL NACKs is above a threshold; and/or the WTRU receives any other explicit indication from the source and/or target cell (e.g., a WTRU may receive a control message indicating that the phased configuration should be released).

In an example, the WTRU may be configured to continue DL data transmission operation towards the source cell. The WTRU may be configured to stop operations related to DL data transmissions (e.g., monitoring for DL grants and/or transmission of feedback related to DL transmissions) in the source cell when one or more of the following conditions are satisfied: the WTRU receives a DL PDU with a special marking indicating that it is the last DL PDU transmitted from the source cell (e.g., an 'End of DL' packet marker from the source cell); the UL resources in the source cell are released; and/or the WTRU receives any other explicit indication from the source and/or target cell (e.g., the WTRU may receive a control message indicating that the phased configuration should be released).

In an example, the WTRU may be configured to continue CSI feedback transmission to the source cell. In another example, when a phased reconfiguration is initiated, a WTRU may be configured to stop CSI feedback transmission to the source cell. The WTRU may be configured with a conservative modulation and coding scheme (MCS) for source cell transmissions when phased reconfiguration is active.

In an example, the WTRU may be configured to enter a non-DRX state in the source cell. If a data gap is configured, a WTRU may perform continuous monitoring during the data gap period on the source cell. In another example, the WTRU may continue performing RLM operation on the source cell. When a phased reconfiguration is initiated, a WTRU may start RLM operation on the target cell. The WTRU may be configured not to declare RLF on the source cell when a WTRU acquires UL resources in the target cell. In another example, a WTRU may continue performing system information and/or paging reception operation in the source cell until the WTRU acquires UL resources in the target cell. The WTRU may start to monitor system information updates and paging channel on the target cell upon acquiring UL resources in the target cell.

In the following, examples are given of WTRU behaviors in the target cell after initiation of phased reconfiguration. In an example, the WTRU may consider that UL resources in the target cell are acquired when one or more of the following conditions are true: a contention resolution succeeds in the target cell; a quality of a target cell is above a threshold and the pre-allocated grant becomes valid (e.g., on or after a predefined starting subframe); and/or the WTRU receives an UL grant in a target cell (e.g., if no pre-allocated grant is provided, the WTRU may monitor for allocated cell radio network temporary identifier (C-RNTI) on the DL at a starting subframe). In an example, the WTRU may be configured to stop SRB transmission to the source cell and start SRB transmission to the target cell when the WTRU acquires UL resources in the target cell. In another example, the WTRU may be configured to perform data transmission associated with DRBs when the WTRU acquires UL resources in the target cell. The WTRU may start UL SR transmission and/or BSR transmission when the WTRU acquires UL resources in the target cell.

Examples of layer 3 (L3)/control plane (CP) processing during a phased configuration are described in the following. In an example, the WTRU may be configured for communication towards a first node (e.g., a master eNB (MeNB)). For example, from the WTRU's perspective, the first node may correspond to a primary cell for a first MAC instance (e.g., a primary cell of a MeNB (PCell)) of the WTRU's configuration. Similarly, a second node (e.g., a secondary eNB (SeNB) or may be the same as the first node) may correspond to a primary cell for a second MAC instance (e.g., a primary cell of an SeNB (PSCell)) of the WTRU's configuration. For example, during a phased reconfiguration, a PCell may initially correspond to a source cell (e.g., on MeNB) while a PSCell may initially correspond to a target cell (e.g., on SeNB). Upon successful completion of the phased reconfiguration procedure, the PCell (i.e., the source cell) may be released. Upon successful completion of the phased reconfiguration procedure, the PSCell (i.e., the target cell) may be promoted to become the PCell (i.e., the new source cell). From the network's perspective, the first and second nodes may be the same node in case of intra-gNB mobility while both may be different nodes in case of inter-gNB mobility. In either case, the identities of the nodes associated with the source and target cells may or may not be visible to the WTRU. In the examples described herein, the terms node, cell (e.g., PCell, PSCell), gNB, MAC instance or cell group may be used interchangeably. In the examples described herein, the first cell may be a source cell (first cell and source cell may be used interchangeably) and the second cell may be a target cell (second cell and target cell may be used interchangeably) and the WTRU may be configured to execute actions before, during or after a mobility event.

Signaling radio bearers (SRBs) may be defined as radio bearers (RB) that are used for the transmission of radio resource control (RRC) and/or non-access stratum (NAS) messages. For example, the following SRBs may be defined: SRB0 may be used for RRC messages (e.g., using the common control channel (CCCH) logical channel); SRB1 may be used for RRC messages (which may include a piggybacked NAS message) as well as for NAS messages prior to the establishment of SRB2, (e.g., using the dedicated control channel (DCCH) logical channel; SRB2 may be used for RRC messages, such as logged measurement information and NAS messages, (e.g., using the DCCH logical channel); and/or SRB3 may be used to carry RRC messages associated with a SgNB, such as for reconfiguration of measurements, L2/L1 reconfigurations and radio link monitoring (RLM) parameter reconfigurations associated with a secondary cell group (SCG)). SRB2 may have a lower-priority than SRB1 and may be configured after security activation.

In the following examples, the WTRU may be configured to perform transmissions on SRB0 during phased reconfiguration. The WTRU may assume that SRB0 is always available and may not need explicit establishment, and/or the WTRU may treat SRB0 establishment similarly as for SRB1 and SRB2. In an example, the WTRU may be configured to suspend primary SRBs (e.g., SRB1 and SRB2) towards the source cell and establish primary SRBs towards the target cell upon preconfigured conditions (examples of preconfigured conditions given below). When the WTRU is configured to apply phased reconfiguration of SRBs during a mobility event, the WTRU may perform one or more of the following actions: establishment of a temporary secondary SRB (e.g., SRB3) towards a second cell (e.g., the target cell), while maintaining one or more primary SRBs (e.g., SRB1 and/or SRB2) towards a first cell (e.g., the source cell); suspension/deletion/removal/release of one or more primary SRBs (e.g., SRB1 and/or SRB2) towards the first cell; establishment of one or more primary SRBs (e.g., SRB1 and/or SRB2) towards the second cell; establishment of a secondary SRB (e.g. SRB3) towards the first cell; and/or, if the one or more primary SRBs of the first cell were previously suspended, removal or release of the one or more suspended primary SRBs upon successful establishment of the primary SRB(s) for the second cell. In another example, SRB1 and SRB2 associated with a second cell (e.g., target cell) may be established during phased reconfiguration. The WTRU may be configured to initiate establishment of SRB1 and SRB2 towards a second cell based on one or more preconfigured conditions (examples of preconfigured conditions given below).

Examples of preconfigured conditions for suspending primary SRBs (e.g., SRB1/2) towards the source cell, and/or establishing the primary SRBs towards the target cell include, but are not limited to, the following conditions: upon completion of random access procedure in the second cell; upon establishing a secondary SRB (e.g., SRB3) with a second cell, for example when the secondary SRB is configured for the WTRU; upon completion of outstanding data buffered in layer 2 (L2) entities (i.e., emptying of buffers) associated with the first cell; upon experiencing radio link problems or declaring RLF in the first cell; upon losing timing synchronization with the source cell (e.g., expiry of TAT timer); upon the release of UL resources associated with the source cell; upon initiation of a reconfiguration triggered by conditional mobility with phased reconfiguration enabled (e.g., following a trigger based on measurements); and/or when the lower layers are successfully configured with the security context associated with the second cell.

In an example, SRB1 and SRB2 associated with a first cell (e.g., source cell) may be suspended during phased reconfiguration. The WTRU may be configured to suspend the SRB1 and SRB2 established with a first cell based on one or more preconfigured conditions. Examples of preconfigured conditions for suspending SRB1/2 associated with the source cell during phased reconfiguration include, but are not limited to, the following conditions: upon establishing a secondary SRB (e.g., SRB3) with a second cell (e.g., upon completion of random access procedure in the second cell); upon initiation of a procedure for establishing SRB1 and/or SRB2 with a second cell; upon completion of outstanding data buffered in L2 entities (i.e., emptying of buffers) associated with the first cell; upon determination of radio link problems and/or of RLF in the first cell (e.g., when the WTRU is configured with a secondary SRB towards a second cell, upon detecting radio link problems towards a first cell, the WTRU may not declare RLF and continue with SRB1/SRB2 establishment with the second cell and suspend SRB1/SRB2 towards first cell); upon losing timing synchronization with the source cell (e.g., expiry of TAT timer); upon the release of UL resources associated with the source cell; and/or when the lower layers are successfully configured with the security context associated with the second cell.

In an example, SRB1 and SRB2 associated with a first cell may be deleted during phased reconfiguration. The WTRU may be configured to delete the SRB1 and SRB2 established with a first cell based on one or more preconfigured conditions. Examples of preconfigured conditions include, but are not limited to, the following conditions: upon successful completion of a procedure that established SRB1 and/or SRB2 with a second cell; upon determination that security has been successfully activated with a second cell; and/or upon initiation of secondary SRB establishment towards the first cell, for example when the secondary SRB is configured for the WTRU.

Figure 3:
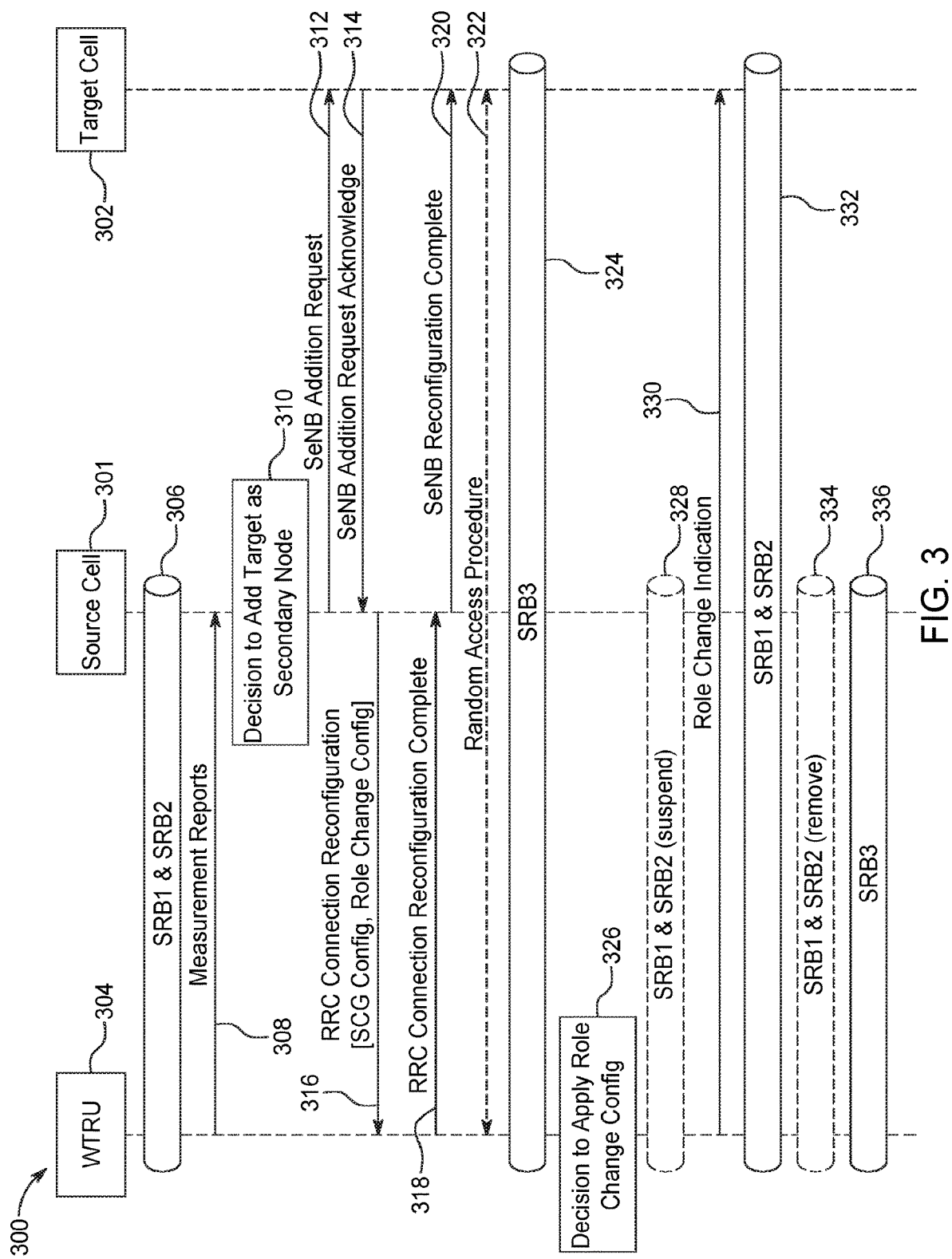
FIG. 3 is a signaling diagram of an example SRB handling procedure during phased reconfiguration of WTRU from source cell to target cell.

FIG. 3 is a signaling diagram of an example SRB handling procedure 300 during phased reconfiguration of WTRU 304 from source cell 301 to target cell 302, for example due to the mobility event of the WTRU 304. WTRU 304 may have an established connection with source cell 301 and may exchange SRB1 and SRB2, 306, with source cell 301. For example, SRB1 and SRB2 may have been established during an RRC connection setup procedure (not shown) between the WTRU 304 and the source cell 301. The WTRU 304 may send measurement reports 308 to source cell 301. A measurement report 308 may include, but is not limited to include, any of the following information: cell quality results (based on single-sideband modulation (SSB) or CSI-RS); individual SSB and/or reference signal measurement results; and/or identity of the cell associated with such measurement results. The WTRU 304 may be configured to perform a reconfiguration by receiving RRC connection reconfiguration message 316 from the source cell 301 that may include an addition (configuration) of a secondary cell group (SCG) (e.g., the SCG may correspond to a target cell 302 during a mobility event), and/or a role change configuration to the target cell 302. At 310, the source cell 301 may decide to add a target cell 302 (e.g., as a secondary node). For example, the decision to add the target cell 302 may be based on the measurements reports 308. The source cell 301 may send a secondary node addition request message 312 (e.g., an SeNB addition request) to the target cell 302, and the target cell 302 may respond with a secondary node addition request acknowledgement 314.

The WTRU 304 may receive a radio resource control (RRC) connection reconfiguration message 316 from the source cell 301. The RRC connection reconfiguration message 316 may include an addition of a PSCell (e.g., target cell 302) and/or a SCG configuration including dedicated radio resource configuration associated with the target cell 302. The WTRU 304 may trigger initial access towards the target cell 302, while still performing data transmission towards the source cell 301. For example, the WTRU 304 may respond to the source cell 301 with an RRC connection reconfiguration complete message 318, and the source cell 301 may send a secondary node reconfiguration complete message 320 to the target cell 302 to complete configuration of the target cell 302 (e.g., to notify the target cell 302 that the WTRU 304 has successfully received the reconfiguration signaling). The WTRU 304 may further establish SRB3, 324, towards the target cell 302, for example in the case that configuration of SRB3 324 is received as a part of the SCG configuration (e.g., in the RRC connection reconfiguration message 316). The WTRU 304 may be configured to make a decision on a role change configuration, 326, wherein the role change configuration may include conditions for SRB1/SRB2 establishment towards the target cell 302 (and/or suspension of SRB1/SRB2 associated with the source cell 301). When one or more preconfigured conditions are satisfied, the WTRU 304 may suspend the SRB1/SRB2 towards the source cell 301, 328, and/or trigger establishment of SRB1/SRB2, 332, towards the target cell 302. In an example, the WTRU 304 may trigger role change based on received commands from the source cell 301 and/or the target cell 302. In an example, the WTRU 304 may send a control message 330 (e.g., RRC reconfiguration complete or any RRC message) to the target cell 302 to indicate the role change indication to the target cell 302. The role change indication control message 330 may be sent on SRB3 if SRB3 is configured and exists. If no SRB3 is configured or available for the target cell 302, the WTRU 304 may transmit the role change indication control message 330 on SRB0 or SRB1. The WTRU 304 may be configured to transmit the role change indication control message 330 with ciphering and integrity protection using the security context derived for the target cell 302.

Upon successful establishment of SRB1/SRB2, 332, on the target cell 302, the WTRU 304 may delete the suspended SRB1/SRB2, 334, associated with the source cell 301. In an example, the WTRU 304 may be configured to establish a secondary SRB (e.g., SRB3), 336, towards the source cell 301. In case of a failure event (not shown), for example when SRB1/SRB2 cannot be established on the target cell 302, the WTRU 304 may be configured to resume the previously suspended SRB1/SRB2 towards the source cell 301. In another example not shown, the WTRU 304 may be configured to report the target cell failure using the resumed SRB1/SRB2 towards source cell 301. Not all possible elements are shown in example SRB handling procedure 300, and any subset of elements of example SRB handling procedure 300 may be performed or omitted as part of a phased reconfiguration procedure for WTRU 304.

Figure 4:
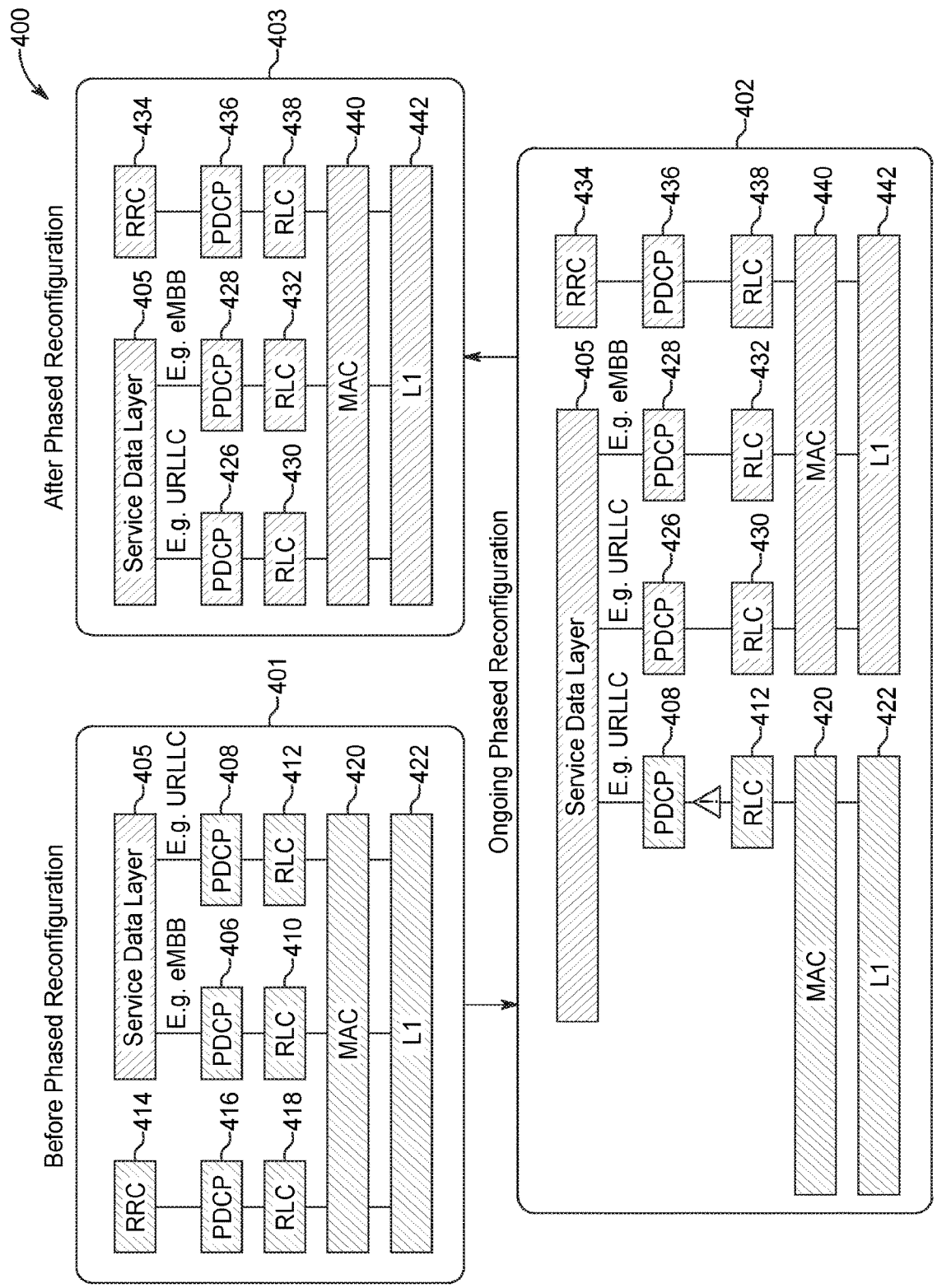
FIG. 4 is a protocol architecture diagram of example UP entities of the WTRU showing the evolution of L2 processing during a phased reconfiguration.

Examples of layer 2 (L2) control plane and user plane (UP) processing during a phased configuration are described in the following. FIG. 4 is a protocol architecture diagram of example protocol entity configurations 400 of a WTRU showing the evolution of L2 processing during a phased reconfiguration. The example WTRU control plane and UP entity configurations 401, 402, 403 correspond respectively to phases of phased reconfiguration: before phased reconfiguration (401), during a phased reconfiguration (402), and after phased reconfiguration has completed (403). The WTRU may be configured to add sequence numbers in a service data layer 405 on top of a PDCP layer. The service data layer 405 may perform duplicate detection, reordering of out-of-order packets for a single bearer served by the PDCP entities corresponding to the source cell and target cell. In an example, the service data layer 405 may handle a mapping between QoS flow and radio bearer. In this approach, the PDCP entities may be configured with independent security handling (e.g., different integrity and/or ciphering keys).

In the example shown in FIG. 4, an initial configuration 401 of control plane protocol entities (RRC 414, PDCP 416, RLC 418) and UP protocol entities (PDCP 406, PDCP 408, RLC 410, RLC 412) for the source cell are shown associated with a MAC instance 420 and layer 1 (L1) instance 422 (e.g., physical layer). When one or more phase-in triggers are satisfied (e.g., per Table 2), then the WTRU may apply a phased reconfiguration and enter on ongoing phased reconfiguration 402. The reconfiguration 402 may include instantiation of user plane entities for one or more bearers (PDCP 426, RLC 430, PDCP 428, RLC 432, PDCP 436, RLC 438) and/or instantiations of control plane entities (RRC 434, PDCP 436, RLC 438) for the target cell and associated with a MAC instance 440 and L1 instance 442. In this example, the WTRU may configure two PDCP entities PDCP 408 (for the source cell) and PDCP 426 (for the target cell) associated with a single (common) bearer and the PDCP entity 428 for a different bearer associate with a different services. The WTRU may stop delivery of new PDCP PDUs from PDCP entity 408 to the RLC entity 412 during the phased reconfiguration 402. After phased reconfiguration 403, the configuration of protocol entities are shown such that the WTRU has phased-out the source cell and all the protocol entities associated with the source cell (i.e., protocol entities 406, 408, 410, 412, 414, 416, 418, 420, 422) are released, and only protocol entities associated with the target cell (i.e., protocol entities 426, 428, 430, 432, 434, 436, 438, 440 and 442) remain along with the service data layer 405.

Figure 5:
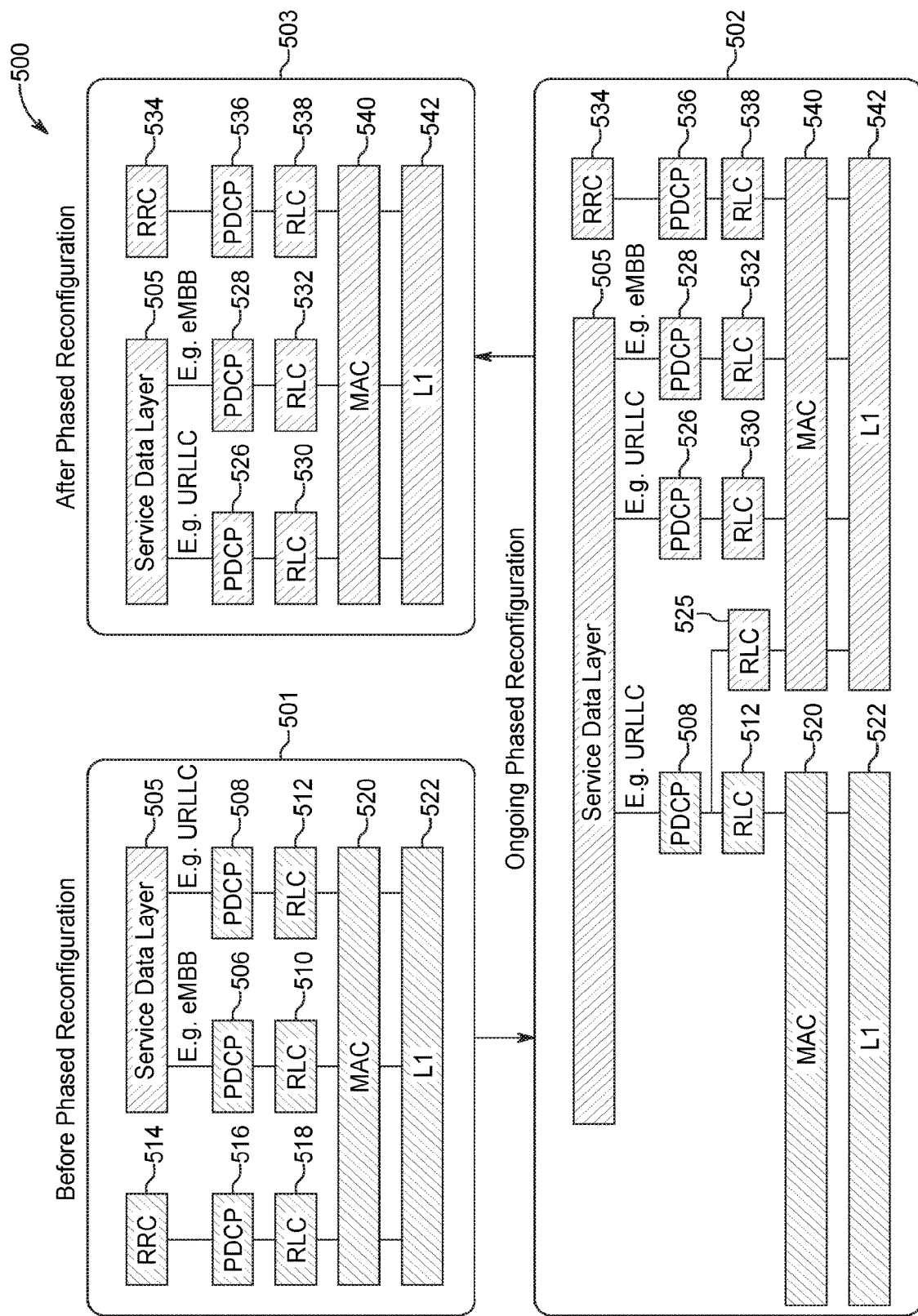
FIG. 5 is a protocol architecture diagram of another example UP entities of the WTRU showing the evolution of L2 processing during a phased reconfiguration.

FIG. 5 is a protocol architecture diagram of another example of protocol entity configurations 500 of a WTRU showing the evolution of L2 processing during a phased reconfiguration. In the example in FIG. 5, the WTRU is configured with a source PDCP entity 508 that enables a split bearer, as explained below. The example WTRU control plane and user plane entity configurations 501, 502, 503 correspond respectively to phases of phased reconfiguration: before phased reconfiguration (501), during a phased reconfiguration (502), and after phased reconfiguration has completed (503). A service data layer 505 is included above the PDCP layer with similar functionality as described in FIG. 4. In FIG. 5, an initial configuration 501 of control plane protocol entities (RRC 514, PDCP 516, RLC 518) and user plane protocol entities (PDCP 506, RLC 510, 508, 512) for the source cell are shown associated with MAC instance 520 and L1 instance 522. When one or more phase-in triggers are satisfied (e.g., examples in Table 2), the WTRU may apply a phased reconfiguration 502, where the reconfiguration may include instantiation of user plane entities for one or more bearers (PDCP 526, RLC 525, RLC 530, PDCP 528, RLC 532) and control plane entities (RRC 534, PDCP 536, RLC 538) for the target cell and associated with the MAC instance 540 and L1 instance 542. The WTRU may configure two PDCP entities (PDCP 508, PDCP 526) for a single bearer associated with service data layer 505. The WTRU may also include a split bearer configuration where the source PDCP entity 508 may be associated with two RLC entities: RLC entity 512 associated with MAC instance 520 for the source cell and RLC entity 525 associated with MAC instance 540 for the target cell. After phased reconfiguration 503, the configuration of protocol entities are shown where the WTRU has phased-out the source cell and all the protocol entities associated with the source cell (i.e., protocol entities 506, 508, 510, 512, 514, 516, 518, 520, 522) are released.

In an example of UP processing during phased reconfiguration, the WTRU may apply a first UP configuration towards the target cell for initial data transmission, and upon the occurrence of preconfigured events, the WTRU may apply a second UP configuration towards the same target cell. Examples of preconfigured events that may trigger the WTRU to apply a second UP configuration towards the same target cell include, but are not limited to, the following events: successful establishment of primary SRBs (e.g., SRB1/2) towards the target cell; suspension of data bearers towards the source cell; the source cell experiencing RLF; quality of the source cell falling below a threshold; quality of the target cell exceeding a threshold; quality of the target cell exceeding the quality of the source cell by predefined amount; the WTRU receiving an UL grant in the target cell; and/or the WTRU detecting RLF in the source cell.

The WTRU may be configured to apply a phased reconfiguration to perform data transmission without interruption during a mobility event. The phased reconfiguration may involve applying a first UP configuration towards the target cell for initial data transmission, and upon the occurrence of certain preconfigured events (examples of preconfigured events given above), the WTRU may apply a second UP configuration towards the same target cell. The WTRU may be configured with a plurality of UP configurations for a given target cell and the WTRU may be configured to apply a specific UP configuration at different times based on preconfigured events, in a phased approach. The phased approach to UP configuration may allow for simultaneous data transmission and/or reception with the source cell and target cell, and may help reduce or even eliminate the interruption times during a mobility event.

The first UP configuration towards the target cell may have any one or more of the following example characteristics. For example, the WTRU may be configured to apply the first UP plane configuration before initial data transmission and/or reception towards the target cell. In another example, the WTRU may apply the first UP configuration before successful initial access towards the target cell. In another example, the WTRU may apply the first UP configuration after successful establishment of a secondary signaling bearer (e.g., SRB3) towards the target cell. In another example, the first UP configuration may coexist with the UP configuration associated with the source cell. In another example, the first UP configuration may be associated with a SCG configuration in the context of dual connectivity (DC). In another example, the first UP configuration may be associated with a secondary security context (e.g., derived based on an existing primary security context associated with a source cell), such as when the first UP configuration is derived based on a source cell key and/or a counter.

The second UP configuration towards the target cell may have any one or more of the following example characteristics. For example, the WTRU may be configured to apply the second UP configuration to perform subsequent data transmission and/or reception towards the target cell. In another example, the WTRU may apply the second UP configuration towards the target cell after successful establishment of primary signaling bearer(s) (e.g., SRB1/SRB2) towards the target cell. In another example, the WTRU may apply the second UP configuration towards the target cell when the data bearers towards the source cell are suspended. In another example, the WTRU may apply the second UP configuration towards the target cell when the source cell experiences RLF. In another example, the WTRU may be explicitly configured with a condition/criterion to determine when to apply the second UP configuration towards the target cell. Example conditions for applying the second UP configuration toward the target cell include, but are not limited to, the following: when the quality of the source cell is below a threshold; when the quality of the target cell is above a threshold; when quality of the target cell is better than the source cell by predefined amount; when the WTRU receives UL grant in the target cell; and/or when the WTRU detects radio link failure in the source cell. In another example, the second UP configuration may be associated with a primary security context anchored in the target cell (e.g., derived based on an identity associated with target cell).

Figure 6:
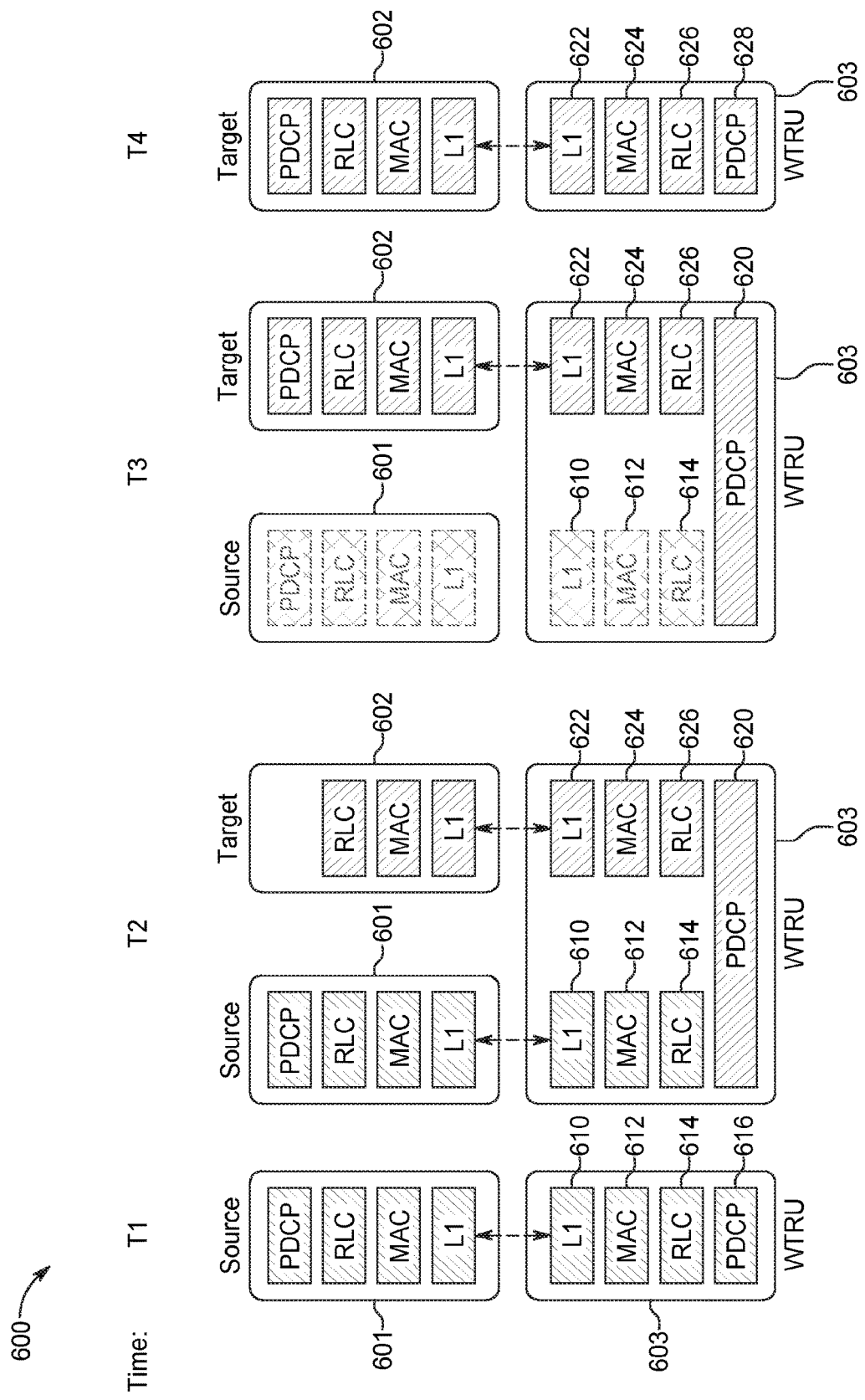
FIG. 6 is a protocol architecture diagram of example UP entities configured during a phased reconfiguration of a WTRU from a source cell to a target cell.
Figure 7:
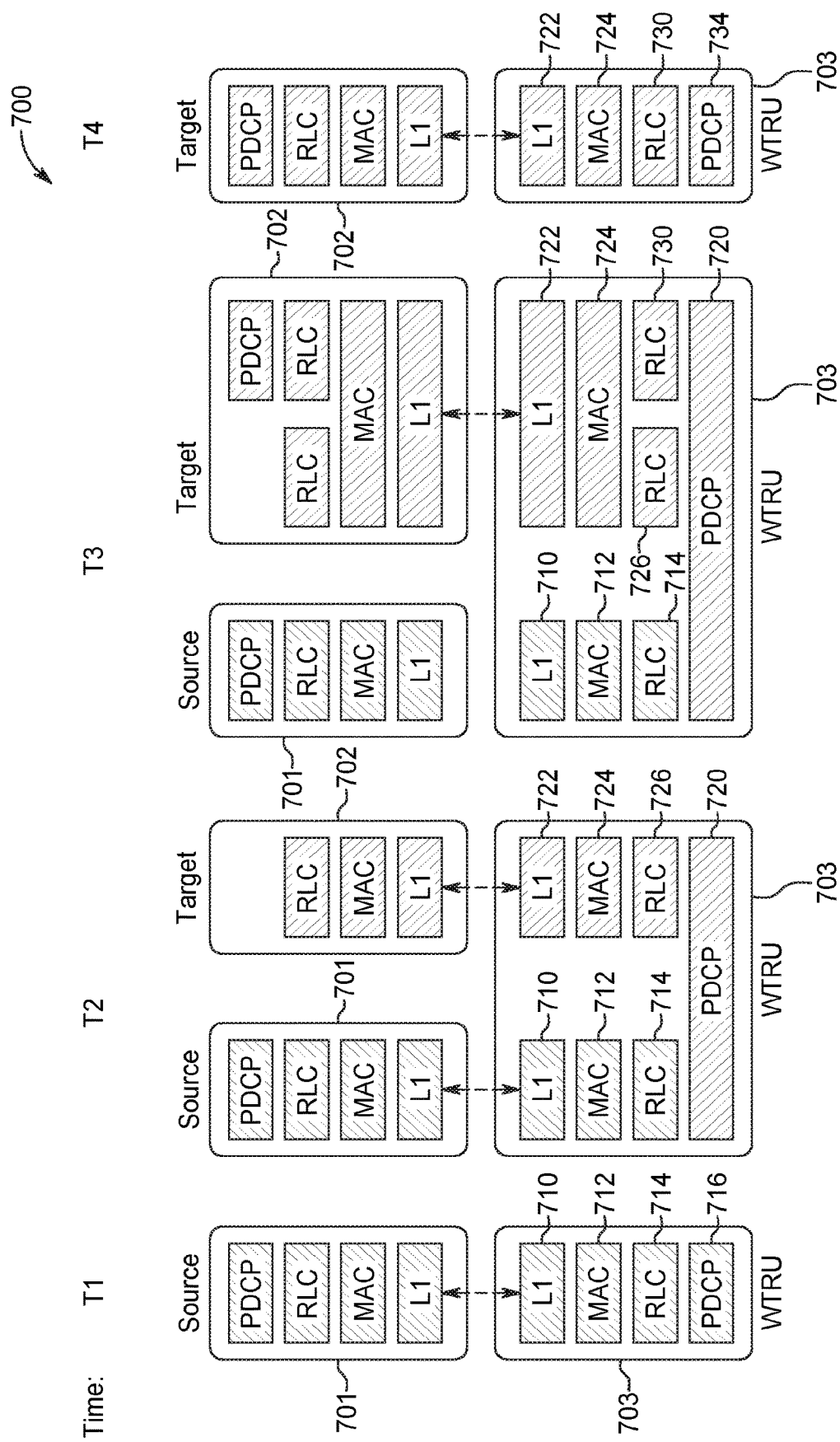
FIG. 7 is a protocol architecture diagram of example UP entities configured during a phased reconfiguration of a WTRU from a source cell to a target cell.
Figure 8:
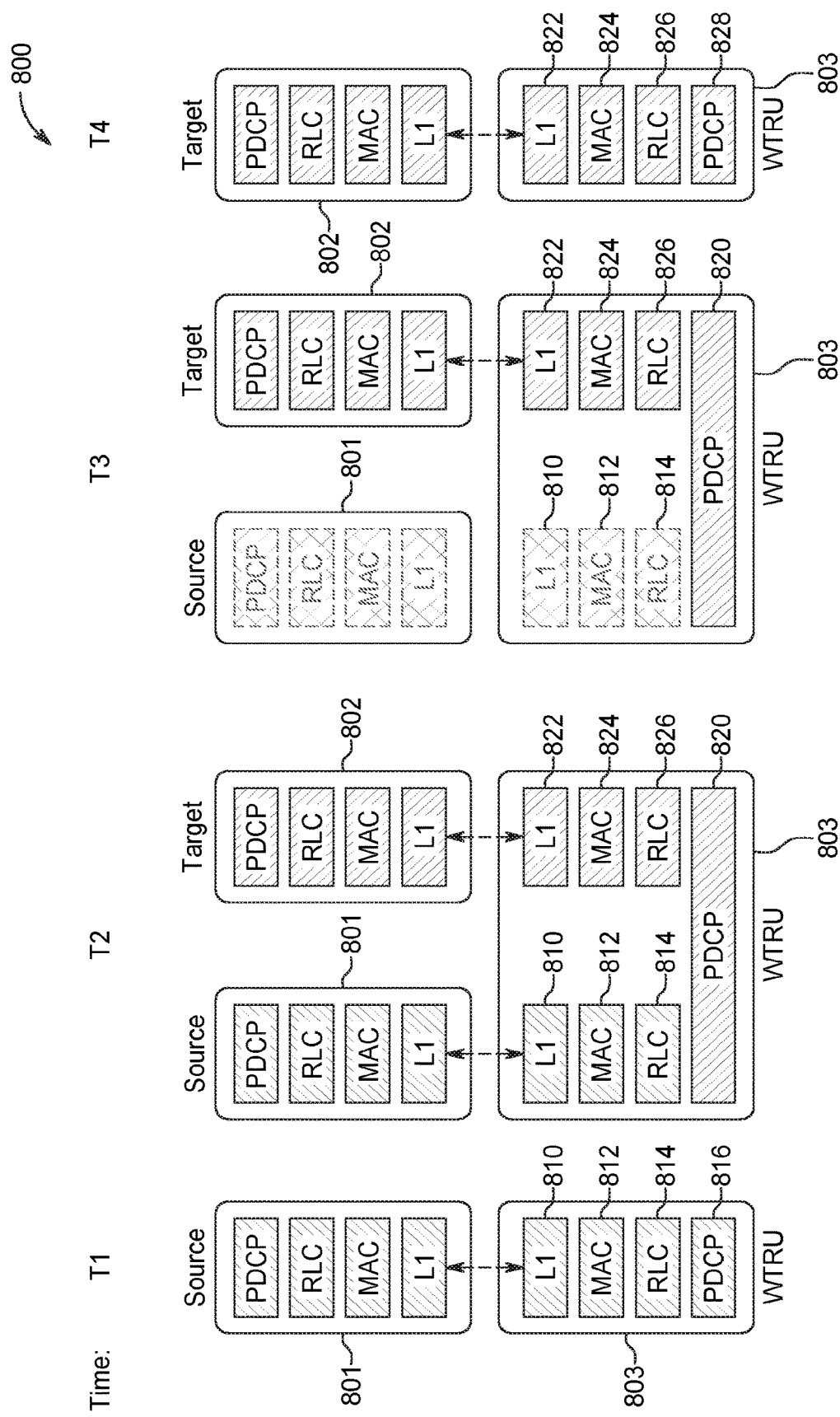
FIG. 8 is a protocol architecture diagram of example UP entities configured during a phased reconfiguration of a WTRU from a source cell to a target cell.

FIGS. 6, 7, and 8 are protocol architecture diagrams of example protocol entity configurations configured during a phased reconfiguration of a WTRU from a source cell to a target cell. In the examples in FIGS. 6, 7, and 8, time T1 may occur prior to phased configuration, when the WTRU is connected to the source cell only, and time T4 may occur after phased configuration is complete, when the WTRU is connected to the target cell only.

In an example, FIG. 6 shows the protocol entity configuration 601 of the protocol entities of the source cell, the protocol entity configuration 602 of the protocol entities of the target cell, and the protocol entity configuration 603 of the protocol entities of the WTRU at times T1, T2, T3, and T4 before, during and after phased reconfiguration. At time T1 before phased reconfiguration, the WTRU is configured with protocol entities (L1 610, MAC 612, RLC 614, PDCP 616) associated with the source cell. At time T2 during phased reconfiguration when the WTRU may receive a RRC reconfiguration from the source cell, the WTRU may be configured to apply a first UP configuration to UP entities (L1 622, MAC 624, RLC 626) associated with the target cell. Thus, the WTRU may instantiate UP entities (L1 622, MAC 624, RLC 626) for the target cell and apply the MAC and RLC configurations associated with the first UP configuration. At time T2, the protocol entity configuration 603 of the WTRU may correspond to a split bearer with PDCP 620 entity associated with source cell. The WTRU may be configured with radio bearers anchored at the target cell, in which case the first UP configuration may include a SCG-counter. In an example, the WTRU may be configured to derive an S-KeNB associated with the target cell based on the SCG-counter, where S-KeNB is a top level key for access stratum security from which the integrity and ciphering keys for RRC and/or UP are derived. The WTRU may subsequently derive user plane encryption and/or integrity protection keys. The WTRU may configure certain layers (e.g. PDCP layer entity not shown) to apply ciphering/integrity protection algorithm and use the newly derived keys. Upon successful application of the first UP configuration, the WTRU may be configured to initiate data transmissions and/or initial access towards the target cell if not already performed.

At time T3, the WTRU may be configured to apply a second UP configuration based on one or more events, for example related to the characteristics of second UP configuration described above. An example event that may trigger the WTRU to apply the second UP configuration may be the WTRU receiving control message(s) from the source cell and/or target cell. At time T3, the WTRU may be configured to instantiate UP entities (L1 622, MAC 624, RLC 628) associated with the target cell based on a second UP configuration. At time T3, the WTRU may be configured to suspend/delete the user plane entities associated with source cell (L1 610, MAC 612, RLC 614). As a result, the WTRU may stop any ongoing data transmission and/or reception towards the source cell. At time T4 after phased reconfiguration is complete, the WTRU is configured with protocol entities (L1 622, MAC 624, RLC 626, PDCP 628) associated with the target cell and not the source cell.

In another example, FIG. 7 shows the protocol entity configuration 701 of the protocol entities of the source cell, the protocol entity configuration 702 of the protocol entities of the target cell, and the protocol entity configuration 703 of the protocol entities of the WTRU at times T1, T2, T3, and T4 before, during and after phased reconfiguration. At time T1 before phased reconfiguration, the WTRU is configured with protocol entities (L1 710, MAC 712, RLC 714, PDCP 716) associated with the source cell. At time T2 during phased reconfiguration when the WTRU may receive a RRC reconfiguration from the source cell, the WTRU may be configured to apply a first UP configuration to UP entities (L1 722, MAC 724, RLC 726) associated with the target cell. Thus, the WTRU may instantiate UP entities (L1 722, MAC 724, RLC 726) for the target cell and apply the MAC and RLC configurations associated with the first UP configuration. At time T2, the protocol entity configuration 603 of the WTRU may correspond to a split bearer with PDCP 720 entity associated with source cell. The WTRU may be configured with radio bearers anchored at the target cell, in which case the first UP configuration may include a SCG-counter. In an example, the WTRU may be configured to derive a S-KeNB associated with the target cell based on the SCG-counter. The WTRU may subsequently derive user plane encryption and/or integrity protection keys. The WTRU may configure other layers (e.g., PDCP layer entity not shown) to apply ciphering/integrity protection algorithm and use the newly derived keys. Upon successful application of the first UP configuration, the WTRU may be configured to initiate data transmissions and/or initial access towards the target cell if not already performed.

At time T3, the WTRU may be configured to apply a second UP configuration based on one or more events, for example related to the characteristics of second UP configuration described above. An example event that may trigger the WTRU to apply the second UP configuration may be the WTRU receiving control message(s) from the source cell and/or target cell. At time T3, the WTRU may be configured to instantiate UP entities (RLC 730) associated with the target cell based on a second UP configuration. At time T3, the WTRU may configure the PDCP entity 720 to process PDCP PDUs from both source cell and target cell. For example, the PDCP entity 720 may apply security functions (e.g. ciphering and integrity) specific to each the source serving cell and the target service cell (e.g., using security context associated with source cell for PDUs received from RLC entities 714 and 728 and using security context associated with target cell for PDUs received from RLC entity 730). For example, the PDCP entity 720 may apply common reordering functions for PDUs received from both source and target cell for a given bearer. At time T4 after phased reconfiguration is complete, the WTRU is configured with protocol entities (L1 722, MAC 724, RLC 730, PDCP 734) associated with the target cell. In an example not shown in FIG. 7 that may occur at time T4 after phased reconfiguration, the WTRU may be configured with a third UP configuration that instantiates UP entities to continue data transmission with the source cell. In an example, the third UP configuration may be associated with a SCG configuration in the context of dual connectivity (DC).

In another example, FIG. 8 shows the protocol entity configuration 601 of the protocol entities of the source cell, the protocol entity configuration 602 of the protocol entities of the target cell, and the protocol entity configuration 603 of the protocol entities of the WTRU at times T1, T2, T3, and T4 before, during and after phased reconfiguration. At time T1 before phased reconfiguration, the WTRU is configured with protocol entities (L1 810, MAC 8, RLC 814, PDCP 816) associated with the source cell. At time T2 during phased reconfiguration when the WTRU may receive a reconfiguration command from the network (e.g., the source cell), the WTRU may be configured to apply a first UP configuration to UP entities (L1 822, MAC 824, RLC 826) associated with the target cell. Thus, the WTRU may instantiate UP entities (L1 822, MAC 824, RLC 826) for the target cell and apply the MAC and RLC configurations associated with the first UP configuration and may apply a common reordering and/or sequencing function for a given bearer such that in-order delivery and duplicate detection are performed per bearer. At time T2, there is on PDCP entity 820 at the WTRU for both active PDCP entities (i.e., in the source configuration 801 and the target configuration 802) in the network. At time T2, the WTRU configurations to perform (de)ciphering and integrity protection functions may be specific to a cell group (i.e., two separate functions per bearer, one for source and another for target). For example, at time T2, the WTRU may configure PDCP entity 820 to apply different security keys based on the RLC entity 814 or 826 from which a PDCP PDU is received. For example, the PDCP entity 820 may apply a first security key for PDUs delivered from the RLC entity 814 associated with source cell and a second security key for PDUs delivered from the RLC entity 826 associated with target cell. In another example, the WTRU may configure PDCP entity 820 to apply different security key based on an indication in the PDCP header, for example the PDCP header may carry a logical index that may identify the security context that needs to be applied for processing the PDCP PDU. In another example, the WTRU may configure PDCP entity 820 to apply different security key based on pre-configured range of PDCP sequence numbers. Upon successful application of the first UP configuration to the UP entities (L1 822, MAC 824, RLC 826), the WTRU may be configured to initiate data transmissions and/or initial access towards the target cell if not already performed.

At time T3, the WTRU may be configured to apply a second UP configuration based on one or more events, for example related to the characteristics of second UP configuration described above. The WTRU may instantiate UP entities (L1 822, MAC 824, RLC 826) associated with the target cell based on a second UP configuration, and the WTRU may be configured to remove the (de)ciphering and integrity protection functions associated with the source cell (L1 810, MAC 812, RLC 814), which may occur after recovering out-of-order PDUs.

Examples of security handling during a phased reconfiguration are given in the following. In an example, the WTRU may perform a security context promotion. The WTRU may be configured to apply ciphering and integrity protection for transmissions/reception to/from the target cell using the secondary security context (e.g., S-KeNB and UP, CP keys derived thereof). In an example, the secondary security context may be derived from a primary security context (e.g., KeNB associated with the source cell) and a counter value (e.g., SCG counter). In an example, the WTRU may be configured to promote the secondary security context to the primary security context (i.e., promote the S-KeNB to KeNB during a phased reconfiguration). In an example, the WTRU may promote the S-KeNB to KeNB and use such KeNB for protection of initial control message exchange for establishment of SRB1/SRB2 towards the target cell. The WTRU may continue to use such KeNB until an explicit reconfiguration of security keys are received from target cell. Promotion of security context may reduce the interruption/signaling overhead to setup new context. The WTRU may be configured to use promoted security context as a basis for deriving security context for another target cell during subsequent mobility events (e.g., using the promoted KeNB and NCC signaled in a mobility command).

Examples of failure handling and exceptions and restrictions during a phased reconfiguration are given in the following. In an example, there may be delays associated with reestablishment procedures that may be excessive in the context of mobility with a need for close to 0 ms interruption. With phased reconfiguration, the interruption associated with a successful mobility procedure can be eliminated (i.e., reduced to 0 ms). Failures (e.g., the WTRU being unable to access the target cell due to RACH failure, the target cell no longer being suitable due to WTRU mobility) during a mobility procedure may not be completely avoidable. The interruption caused by failed mobility procedure may have a significant impact on a service that expects 0 ms interruption. Thus, it may be more important to reduce the interruptions associated with failed mobility procedures. The WTRU may determine that an error/failure occurred during a phased reconfiguration procedure (e.g., when the phased reconfiguration procedure cannot be completed within a preconfigured time (e.g. T304), or when the WTRU cannot comply with parts of configuration associated with the phased reconfiguration).

In an example, the WTRU may be configured to perform enhanced reestablishment procedure with quasi-multi-connectivity to recover from failure during a mobility procedure. For example, the WTRU may resume suspended SRBs associated with preconfigured SCGs prepared for the enhanced reestablishment procedure. In an example, the WTRU may be explicitly configured with one or more SCGs for the enhanced reestablishment procedure. In another example, the WTRU may be configured to implicitly determine that a gNB is prepared for the reestablishment. For example, the WTRU may consider all the gNBs within the same RAN area as candidates for enhanced reestablishment. In another example, the WTRU may be preconfigured with SRBs and security contexts associated with each of the preconfigured SCGs, and the pre-configuration may provide a quasi-multi-connectivity (e.g., the WTRU contexts may be available at each of the preconfigured SCGs). The WTRU may perform activation of suspended SRBs by transmission of a dedicated preamble. If the WTRU determines that the gNB is not a candidate for enhanced reestablishment, the WTRU may perform regular (non-enhanced) reestablishment.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) configured to perform phased reconfiguration from a source cell to a target cell, wherein the WTRU is initially connected to the source cell, the WTRU comprising:
    a processor operatively coupled to a transceiver;
    the processor and transceiver configured to:
    execute a first set of functions with the source cell until detection of at least one of a first set of preconfigured trigger conditions; and
    execute a second set of functions with the target cell based on detection of at least one of a second set of preconfigured trigger conditions while continuing to execute the first set of functions with the source cell, wherein the second set of preconfigured trigger conditions include uplink (UL) resources in the target cell becoming available, and wherein the first set of functions and the second set of functions include transmitting UL data.

2. The WTRU of claim 1, wherein the processor and the transceiver are further configured to receive, from the source cell, the second set of preconfigured trigger conditions and the first set of preconfigured trigger conditions in at least one control message.

3. The WTRU of claim 1, wherein the processor and the transceiver are further configured to send a notification when the WTRU can simultaneously receive and process transmissions from the source cell and the target cell.

4. The WTRU of claim 1, wherein each of the first set of functions and the second set of functions further include at least one of the following functions: monitoring for UL grants; monitoring scheduling requests (SRs); monitoring for buffer status reports (BSRs); transmitting channel quality indicator (CQI) information; monitoring for downlink (DL) grant; monitoring for DL or data; transmitting UL acknowledgment/negative acknowledgment (ACK/NACK); transmitting signaling radio bearers (SRBs); entering discontinuous reception (DRX) mode; performing radio link monitoring (RLM); updating system information; or monitoring for paging.

5. The WTRU of claim 1, wherein the second set of preconfigured trigger conditions further includes at least one of the following conditions: UL data is available for transmission in the target cell; or at least one signaling radio bearer (SRB) is established in the target cell.

6. The WTRU of claim 1, wherein the first set of preconfigured trigger conditions includes: all pending buffered data for the source cell is transmitted; UL resources in the source cell are released; explicit indication to discontinue functions to the source cell is received; packet latency in the source cell is above a threshold; a number of retransmissions in the source cell is above a threshold; a number of downlink (DL) negative acknowledgements (NACKs) in the source cell is above a threshold; an "end of DL" packet marker is received from the source cell; DL monitoring in the source cell is stopped; or signaling radio bearer 1 (SRB1) and/or signaling radio bearer 2 (SRB2) are released or suspended in the source cell.

7. The WTRU of claim 1, wherein the processor and the transceiver are further configured to release UL resources in the source cell when at least one of the following conditions is true: the WTRU is no longer UL time aligned in the source cell; a cell quality of the source cell based on reference signal measurements is below a threshold; or a radio link failure (RLF) occurs in the source cell.

8. The WTRU of claim 1, wherein the processor and the transceiver are further configured to suspend first primary signaling radio bearers (SRBs) with the source cell and establish second primary SRBs with the target cell in response to completion of a random access procedure in the target cell.

9. The WTRU of claim 8, wherein the processor and the transceiver are further configured to:
remove the first primary SRBs with the source cell once the second primary SRBs with the target cell are established; and
send, to the target cell, a control message including a role change indication.

10. The WTRU of claim 1, wherein the processor and the transceiver are further configured to maintain at least one primary signaling radio bearer (SRB) with the source cell and establish a temporary secondary SRB with the target cell in response to UL resources becoming available in the target cell.

11. A method performed by a wireless transmit/receive unit (WTRU) for phased reconfiguration from a source cell to a target cell, wherein the WTRU is initially connected to the source cell, the method comprising:
executing a first set of functions with the source cell until detection of at least one of a first set of preconfigured trigger conditions; and
executing a second set of functions with the target cell based on detection of at least one of a second set of preconfigured trigger conditions while continuing to execute the first set of functions with the source cell, wherein the second set of preconfigured trigger conditions include uplink (UL) resources in the target cell becoming available, and wherein the first set of functions and the second set of functions include transmitting UL data.

12. The method of claim 11, further comprising:
receiving, from the source cell, the second set of preconfigured trigger conditions and the first set of preconfigured trigger conditions in at least one control message.

13. The method of claim 11, further comprising:
sending a notification when the WTRU can simultaneously receive and process transmissions from the source cell and the target cell.

14. The method of claim 11, wherein each of the first set of functions and the second set of functions further include at least one of the following functions: monitoring for UL grants; monitoring scheduling requests (SRs); monitoring for buffer status reports (BSRs); transmitting channel quality indicator (CQI) information; monitoring for downlink (DL) grant; monitoring for DL or data; transmitting UL acknowledgment/negative acknowledgment (ACK/NACK); transmitting signaling radio bearers (SRBs); entering discontinuous reception (DRX) mode; performing radio link monitoring (ELM); updating system information; or monitoring for paging.

15. The method of claim 11, wherein the second set of preconfigured trigger conditions further includes at least one of the following conditions: UL data is available for transmission in the target cell; or at least one signaling radio bearer (SRB) is established in the target cell.

16. The method of claim 11, wherein the first set of preconfigured trigger conditions includes: all pending buffered data for the source cell is transmitted; UL resources in the source cell are released; explicit indication to discontinue functions to the source cell is received; packet latency in the source cell is above a threshold; a number of retransmissions in the source cell is above a threshold; a number of downlink (DL) negative acknowledgements (NACKs) in the source cell is above a threshold; an "end of DL" packet marker is received from the source cell; DL monitoring in the source cell is stopped; or signaling radio bearer 1 (SRB1) and/or signaling radio bearer 2 (SRB2) is released or suspended in the source cell.

17. The method of claim 11, further comprising:
releasing UL resources in the source cell when at least one of the following conditions is true: the WTRU is no longer UL time aligned in the source cell; a cell quality of the source cell based on reference signal measurements is below a threshold; or a radio link failure (RLF) occurs in the source cell.

18. The method of claim 11, further comprising:
suspending first primary signaling radio bearers (SRBs) with the source cell and establishing second primary SRBs with the target cell in response to completion of a random access procedure in the target cell.

19. The method of claim 18, further comprising:
removing the first primary SRBs with the source cell once the second primary SRBs with the target cell are established; and
sending, to the target cell, a control message including a role change indication.

20. The method of claim 11, further comprising:
maintaining at least one primary signaling radio bearer (SRB) with the source cell and establishing a temporary secondary SRB with the target cell in response to UL resources becoming available in the target cell.

* * * * *